United States Patent
Elkarat et al.

(10) Patent No.: US 7,139,570 B2
(45) Date of Patent: Nov. 21, 2006

(54) PREFERRED NETWORK SELECTION

(75) Inventors: Shany Elkarat, Petach Tikva (IL);
Shahar Florence, Shoham (IL);
Shiomo Wolfman, Hod Hasharon (IL);
Shai Ophir, Moshav Ein-Vered (IL);
Kobi Fester, Tel Aviv (IL)

(73) Assignee: StarHome GmbH, Zurich (CH)

( * ) Notice: Subject to any disclaimer, the term of this patent is extended or adjusted under 35 U.S.C. 154(b) by 223 days.

(21) Appl. No.: 10/806,281

(22) Filed: Mar. 23, 2004

(65) Prior Publication Data

US 2004/0192306 A1 Sep. 30, 2004

Related U.S. Application Data

(60) Provisional application No. 60/517,395, filed on Nov. 6, 2003, provisional application No. 60/473,891, filed on May 29, 2003, provisional application No. 60/456,537, filed on Mar. 24, 2003.

(51) Int. Cl.
 *H04Q 7/20* (2006.01)
 *H04M 1/00* (2006.01)
(52) U.S. Cl. ............... 455/432.3; 455/432.1; 455/433; 455/435.1; 455/435.2; 455/550.1
(58) Field of Classification Search .. 455/432.1–432.3, 455/423–425, 422.1, 433–434, 435.1, 435.2, 455/436–451, 452.1, 452.2, 453, 456.1–456.6, 455/466, 435.3, 461, 464, 515–517, 412.1–412.2, 455/404.2, 410–411, 418–420, 403, 524–525, 455/550.1, 556.2, 560–561; 370/328–329, 370/331–332, 310.2, 312
See application file for complete search history.

(56) References Cited

U.S. PATENT DOCUMENTS 5,564,068 A * 10/1996 Nguyen .................. 455/433

(Continued)

FOREIGN PATENT DOCUMENTS

EP 0 719 064 A2 * 6/1996

(Continued)

OTHER PUBLICATIONS

ETSI—GSM "Digital Cellular Telecommunications system (Phase 2+) (GSM); Universal Mobile Telecommunications System (UMTS); Mobile Radio Interface Layer 3 Specification, Core Network Protocols—State 3"—(3G TS 24.008 version 3.2.1 Release 1999).

(Continued)

*Primary Examiner*—Meless Zewdu

(57) ABSTRACT

A remote preference unit for influencing visited network selection by roaming mobile units, comprises a detection signaling relay/probe on International signaling connections, for detection of roaming activity by mobile units, a database indicative of preferred networks in the given country that the network operator prefers his roamers to use, application logic with certain criteria, determining the output, and an output unit, associated with said detection probe and said database to output indications to influence network selection by said detected roaming mobile units. In one embodiment the output is simply a rejection of the location update signal that forms the roaming request. In an alternative embodiment the signal is a copy of the relevant section of the database which is uploaded to the SIM card of the roaming unit. The SIM card upgrade may or may not be accompanied by a stage of forcing the handset to re-initiate the network selection process.

7 Claims, 16 Drawing Sheets

U.S. PATENT DOCUMENTS

| | | | |
|---|---|---|---|
| 5,950,130 A * | 9/1999 | Coursey | 455/432.1 |
| 5,999,811 A * | 12/1999 | Molne | 455/432.3 |
| 6,122,503 A * | 9/2000 | Daly | 455/419 |
| 6,148,197 A * | 11/2000 | Bridges et al. | 455/432.3 |
| 6,223,028 B1 * | 4/2001 | Chang et al. | 455/419 |
| 6,411,807 B1 * | 6/2002 | Amin et al. | 455/432.3 |
| 6,560,455 B1 * | 5/2003 | Amin et al. | 455/432.3 |
| 6,564,055 B1 * | 5/2003 | Hronek | 455/433 |
| 6,625,451 B1 * | 9/2003 | La Medica et al. | 455/434 |
| 6,735,434 B1 * | 5/2004 | Criss et al. | 455/418 |
| 6,965,781 B1 * | 11/2005 | Lewis | 455/522 |
| 2002/0193127 A1 * | 12/2002 | Martschitsch | 455/466 |
| 2004/0087305 A1 * | 5/2004 | Jiang et al. | 455/432.1 |
| 2004/0203757 A1 | 10/2004 | Nasilski | |
| 2004/0204117 A1 * | 10/2004 | Weiner | 455/564 |
| 2004/0224680 A1 | 11/2004 | Jiang | |
| 2005/0070278 A1 | 3/2005 | Jiang | |
| 2005/0186950 A1 | 8/2005 | Jiang | |

FOREIGN PATENT DOCUMENTS

| | | |
|---|---|---|
| EP | 889661 | 7/1999 |
| EP | 1463366 | 9/2004 |
| WO | WO 98/23108 | 5/1998 |
| WO | WO 04/014101 | 2/2004 |
| WO | WO 04/075484 | 2/2004 |
| WO | WO 04/075579 | 2/2004 |
| WO | WO 2004/075598 | 2/2004 |
| WO | WO 2005/017693 | 2/2005 |
| WO | WO 2005/018245 | 2/2005 |
| WO | WO 05/086927 | 9/2005 |
| WO | WO 2005/081962 | 9/2005 |

OTHER PUBLICATIONS

ETSI "Universal Mobile Telecommunications system (UMTS); NAS Functions related to Mobile Station (MS) in Idle Mode"—(3G TS 23.122 version 3.1.0. Release 1999).

* cited by examiner

PREFERRED NETWORK SELECTION

RELATIONSHIP TO EXISTING APPLICATIONS

The present application claims priority from U.S. Provisional patent application Nos. 60/517,395—filed Nov. 6, 2003, also 60/473,891 filed May 29, 2003, and 60/456,537 filed Mar. 24, 2003, the contents of each of which are hereby incorporated by reference.

FIELD AND BACKGROUND OF THE INVENTION

The present invention relates to selection of a preferred network for roaming and, more particularly, but not exclusively to a method or system for influencing a roaming mobile unit to make such a selection.

Mobile telephones are becoming more and more a part of life, and people expect their mobile telephones to work everywhere, including when they cross International borders. That is to say people do not expect to have to reprogram or replace their telephones every time they travel abroad. As a result, a secondary mobile telephone infrastructure has developed, known as the roaming infrastructure, to provide support for mobile telephones that log in for cellular connections in countries which are not their own.

Any given region or country has a number of cellular networks providing signals. A user subscribes to one of these networks and whenever he switches on his telephone it logs into the network to which he has subscribed, otherwise referred to as his home network. The mobile telephone simply ignores other, competing networks. When mobile devices are outside of their home region, there is also likely to be a range of competing networks. However this time there is no default choice for logging on since none of these networks are the user's home network. Nevertheless there may be good reason for selecting one network over another. One network might simply offer a better tariff than the others, or may offer greater reliability, or the home network may want to concentrate all of its roamers in a single network in order to obtain a volume discount, or a particular network in the foreign country may simply belong to the same group as the user's home network.

Generally mobile telephones have preprogrammed settings, which are often stored in an on-board programmable unit. In GSM telephones such settings may be stored in the subscriber identification module or SIM card. It is possible to preprogram the unit to carry a preference order for selecting networks in the given region. Thus a mobile telephone whose home network is in France may have been provided with a preference list giving the order for selection of networks in the UK. When in the UK, the mobile telephone attempts first of all to log in to the network at the top of the list, then the second and so on until it succeeds.

There are two major disadvantages with the preprogrammed list. First of all the capacity available on board the SIM is limited. Thus it is possible to provide preference data for a small number of most likely regions only. In most regions of the world the mobile phone simply has no guidance. Secondly, a given provider's list of which networks are preferred in a given country is not necessarily static. New deals can be signed, companies can merge and new tariffs worked out so that the economics of the situation changes at short notice. However there is no efficient way to remotely update the telephone. It is possible to remotely update a SIM card with a new data file, but the update would have to be sent to every single subscriber including many who have no intention of ever roaming in the given region, and this is simply wasteful of resources, and especially of SIM card memory.

Considered in greater detail, as the mobile telecom market becomes more and more competitive, mobile network operators join larger business groups either as subsidiaries or as members of an alliance organization.

Striving to maximize group or alliance revenue as well as recognizing the roaming segment as an increasingly significant revenue generator, group members want their outbound roamers to register with other group member networks in the countries they visit. These networks are designated by operators as their Preferred Networks.

Yet non-group network operators may also have reasons to designate some networks as preferred networks in countries where their subscribers roam. Among these reasons are different roaming agreements, potential coverage and traffic volume. New roaming agreements, new tariff schemes and changing preferences are established facts. In addition, preferences can be based on the kind of user, so-called community-based preferences. Thus for example prepaid users may have different preferences than GPRS users. The 3G arena may in fact present different preferences per service, thus for example the preferred roaming network for voice services may be different than the one for data services. For example the best network for voice may be selected based on the tariff offered, whereas the best network for data services may be selected on the basis of technical reliability and bandwidth.

For these reasons network operators would like to have the ability to direct the handsets of their outbound roamers to preferred networks whenever they roam in foreign countries. Such directing tools must be flexible enough to allow network redirection at any time independently of the operational state of the handset, as long as the handset is powered and the preferred network provides the required air-link coverage.

Furthermore, the ability to seamlessly and flexibly steer handsets to the preferred network can be used by operators as a means to achieve better terms and conditions of the roaming agreements they sign with partnering network operators.

Existing SIM and over the air (OTA) solutions for updating a SIM card cover handsets complying with the GSM Phase 2+ standard. Earlier handset versions support downgraded functionality. Nevertheless, as explained, most installed SIM cards have a small memory that is not sufficient for any significant OTA download and for running any required preferred network applets. In addition, limited processing capability means that handsets are only able to scan the first few networks in any list of preferred networks that they may be carrying.

Furthermore, there are networks that do not use SIM cards at all, such as CDMA-based networks, but still want to control roaming distribution. In addition, the install base of existing SIM cards includes devices of various generations with different capabilities, so the problem is not only the lack of functionality of the SIM as such, but the lack of a generic solution, which can cover 100% percent of the devices on a given network, is applicable to all networks and is effective and provides the desired features in an effective manner.

As a result of the above, network operators seek a home-network-based, handset independent remote control of the network selection process that is carried out by the roaming handset. That is to say, the solution is to be independent of the SIM and handset themselves.

It is anticipated that operators may also want a complementary home-network control on handset operation of the network selection process. Finally, operators wish to have the flexibility to apply different activation policies for the preferred network function based on different parameters such as the visited country/network, different times and different subscriber segments.

There is thus a widely recognized need for, and it would be highly advantageous to have, a roaming network selection preference system devoid of the above limitations.

SUMMARY OF THE INVENTION

According to one aspect of the present invention there is provided a remote preference unit for influencing visited network selection by roaming mobile units, the preference unit comprising:

a detection unit for detection of roaming activity by mobile units a database indicative of preferred networks for selection by roaming units, and an output unit, associated with said detection probe and said database to output indications to influence network selection by said detected roaming mobile units.

Preferably, the unit comprises logic for assigning different preference information under different conditions.

Preferably, said conditions comprise time, such that different network selection preferences are sent out based on different times.

Preferably, a time used to set said preferences is local time at a roaming location.

Preferably, said conditions comprise one of profile settings and abilities of an individual roaming handset.

Alternatively or additionally, said conditions are based on a segment of users to which a current handset belongs, such that said preference information is applied differently to different segments.

Alternatively or additionally, said conditions comprise the proportions of roaming users currently connected to different available networks in a given roaming region.

Alternatively or additionally, said output signal is a failure to reply to a roaming request in a given time, thereby inducing a time-out to said request.

Preferably, said output indications are rejection signals to roaming request attempts to respective non-preferred roaming networks.

Preferably, said roaming rejection signals are sent to location infrastructure of respective non-preferred roaming networks, thereby to cause a roaming request attempt to fail at said non-preferred network and force said mobile units to re-attempt roaming requests, thereby at said reattempting to select a preferred roaming network.

Preferably, said indications comprise an up-to-date version of at least a part of said database for downloading to said detected mobile units, said mobile units thereby being enabled to consult said up to date version for network selection.

In one embodiment the apparatus comprises a connection to a SIM card infrastructure, through which to download said up to date version to said mobile units.

Preferably, said connection is operable to download said up to date version using binary SMS.

Preferably said connection is further operable to download an applet to said mobile unit to govern use of said up to date version.

Preferably said applet contains dialing services customized for a current roaming region.

Preferably, said dialing services customized for a current roaming region are any one of a group comprising intelligent call completion, home short code, world wide number, and iVPN.

Preferably, said output unit further comprises an association with said probe for rejecting a roaming request from a respective non-preferred roaming network, in association with said download of said up to date version.

According to a second embodiment of the present invention there is provided mobile infrastructure comprising:

a connection control path for passing control data for individual mobile telephony connections, a card control path for passing binary data for updating control information at a programmable card at an individual mobile unit, and an operable connection between said connection control route and said card control route to enable data obtained from said connection control route to bemused to activate an update operation via said card control route.

Preferably, said connection control route is a roaming control route for controlling roaming telephony connections.

Preferably, said connection control route is an SS7-based control route.

Alternatively or additionally, said connection control route is a MAP-based control route.

Preferably, said update operation is an operation to provide a given mobile unit with up-to-date information regarding a current roaming environment.

Preferably, said up-to-date information comprises updating one of a group of SIM card network location features comprising a preferred network (PLMSEL) file, a most recently used field (RPLMN field) of an LOCI file and a forbidden network (FPLMN) file.

Preferably, said data obtained from said connection control route is an indication of a given mobile unit roaming in a given roaming environment.

Preferably, said current roaming environment comprises a plurality of available networks, and said up-to-date information comprises preference information for selecting between said available networks.

The infrastructure may further comprise logic for assigning different preference information under different conditions.

Preferably, said conditions comprise time, such that different network selection preferences are sent out based on different times.

Preferably, a time used to set said preferences is local time at a roaming location.

Preferably, said conditions comprise one of profile settings and abilities of an individual roaming handset.

Alternatively or additionally, said conditions are based on a segment of users to which a current handset belongs, such that said preference information is applied differently to different segments.

In an embodiment, said conditions comprise the proportions of roaming users currently connected to different available networks in a given roaming region.

The infrastructure may comprise an output unit for sending a roaming reject signal to a non-preferred network through which a roaming mobile telephony connection is being attempted.

The infrastructure may comprise a preference unit for rejecting a request to use a non-preferred network by preventing reply signaling and thereby causing said request to time out.

According to a third aspect of the present invention there is provided an updating method for updating programmable settings on a mobile telephone unit, comprising:

probing connection control signaling between a visited and a home network of said mobile telephone unit, and responding to said control signaling by outputting update information to said mobile telephone unit to update programmable settings thereof.

Preferably, said connection control signaling comprises data regarding roaming activity of said mobile unit in any one of a plurality of roaming environments, each roaming environment comprising a plurality of available roaming networks to which said mobile unit is able to make a roaming connection, and wherein said update information comprises updated preference data ranking said available roaming networks in an order of selection preference.

The method may comprise making said update information available via at least one of a group comprising binary SMS and GPRS.

The method may comprise making said update information available to a programmable telephone setting card of said mobile unit.

Preferably, said programmable phone setting card is a subscriber identity module (SIM).

According to a fourth aspect of the present invention there is provided a roaming network selection influencing method for influencing mobile units regarding network selection when connecting in a roaming environment having a plurality of available networks, the method comprising:

probing roaming connection control signaling between said mobile telephone unit and mobile network infrastructure to obtain an indication that a given unit is attempting a roaming connection from a given roaming environment, checking a database giving a preference order amongst available networks in said given roaming environment, and if said roaming control signaling indicates that said mobile telephone unit is making a current roaming request via a non-preferred network then controlling said connection control signaling to refuse a roaming request to said non-preferred network, thereby to cause said mobile unit to find another network within said environment to reattempt a roaming request.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
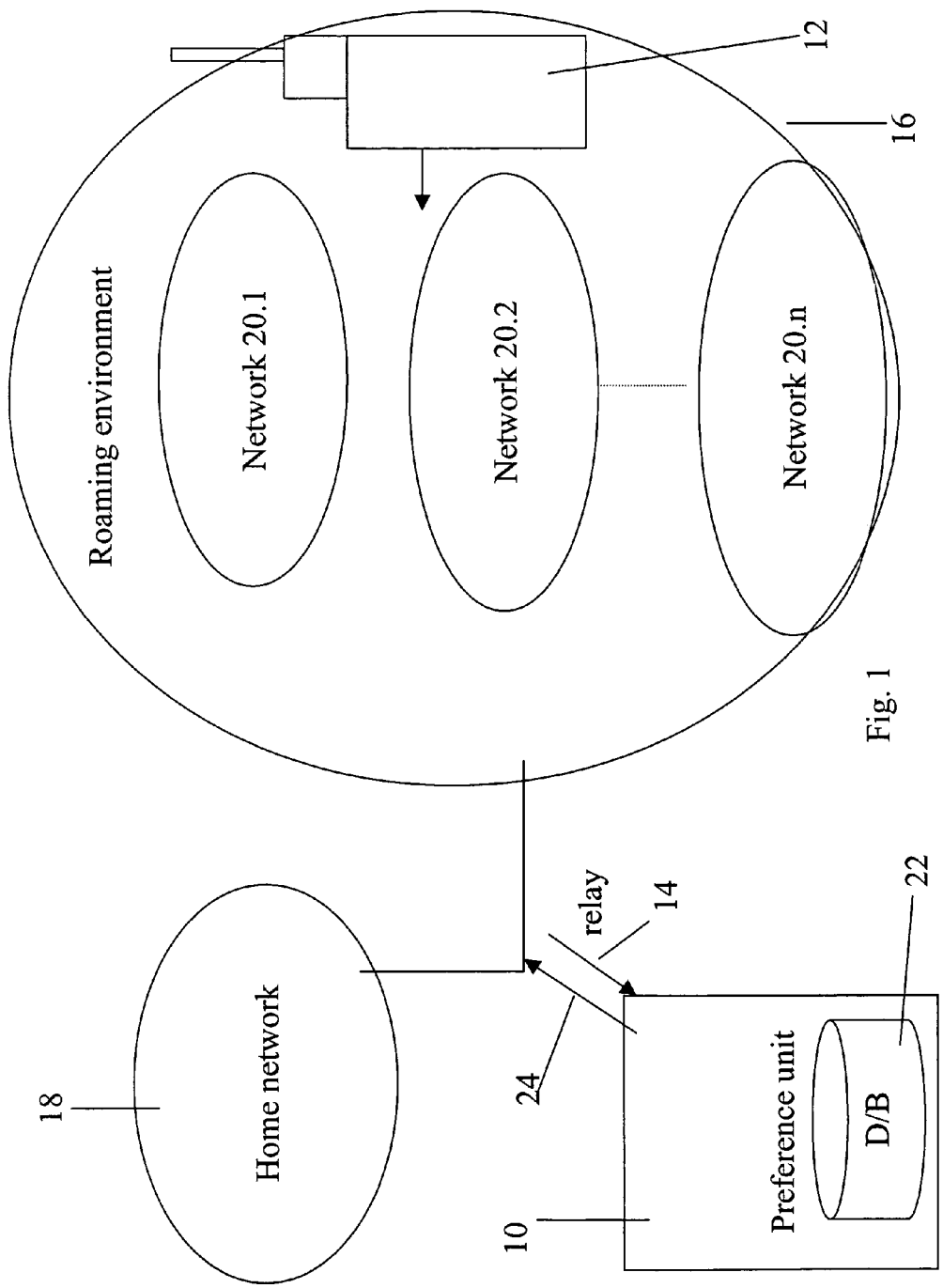
FIG. 1 is a simplified diagram showing a network preference unit in relation to a home network and a roaming environment in accordance with a preferred embodiment of the present invention.

The present embodiments comprise a system in which roaming in a given roaming environment is detected, in one embodiment by a signaling relay, in another embodiment by a probe, and in a third embodiment by receiving information from home network about users registering via roaming. Monitoring may be of the signaling connection to the home network over which control signals are exchanged with the roaming network, for example MAP and SS7 protocol signaling. Relaying may involve monitoring the same signals but then actively modifying the signal flow control. The region, typically the country, in which roaming is taken place, or roaming environment, may have two or more available networks that the given roamer can in practice connect to. The system obtains a list comprising an order of preference for the available networks and sends a corresponding output to influence the roaming mobile unit's choice of network.

In a first preferred embodiment, hereinafter the rejection embodiment, the output is a kind of registration rejection including a registration rejection signal. More particularly three preferred versions of this embodiment are provided, each using a different type of reject.

(1) a MAP protocol rejection signal
(2) a MAP protocol abort signal, and
(3) rejecting the registration attempt simply by ignoring the request, and not sending any response.

In any case the roaming registration attempt is stopped if it is noted from the database that this is not the preferred network. As a result the mobile unit is forced to try registration again, and this time may find a more favorable network. In an embodiment there is also a method for locking out the current network following such a rejection, and this is preferably achieved by adding the current network into a forbidden list stored on the SIM card. The process is repeated until the unit logs in to the highest network on the list that is in fact available, roaming registration therefrom being allowed.

In a second embodiment, referred to hereinbelow as the SIM update embodiment, the output is a signal that includes the preference list for the current environment. The signal is sent to the handset and is used to update the SIM with the list of preferred networks for the country in which the handset is roaming. It will be appreciated that the output need not merely be a list of preferred networks in itself, but may optionally include data for modifying other files on the SIM, and performing a SIM Initialization or refresh operation, which forces the handset to re-initiate the network selection process. In particular the files that can be modified on the SIM are:

(1) The PLMNSEL file, which contains the preferred list of networks
(2) the LOCI file, which contains the RPLMN—the Registered PLMN—which is the current roaming network the handset is registered to, and
(3) the FPLMN—the forbidden list of networks which should not be selected (which can be modified as well.

The LOCI change is preferably carried out before attempting to initialize the SIM, otherwise the re-selection process falls back to the currently registered network. That is to say in general the network recorded in the LOCI file is the default selection whatever any preference list may say. The FPLMN may be used if the home network does not want a specific network to be selected at all. Such a situation is unlikely since the home network has some kind of a roaming agreement with it, but it is available as a temporary option. All of the above operations can be triggered, not just as a result of the herein-mentioned Update Location signaling, but preferably at any point of time, that point being something that can be determined by the home network. Typically the preference list is downloaded, say using GPRS or binary SMS, to the SIM card in the case of GSM, or other program settings card of the mobile unit. In this embodiment an operative connection is provided between the program setting infrastructure and the telephone connection infrastructure.

In either case the problems of limited capacity on the SIM card and timely updating are solved. In the first embodiment the preference list is retained at the home network and in the second case updated lists are sent for specific roaming environments only once the particular mobile unit has been detected entering the specific environment. Thus data relating to only a small and manageable number of networks are stored in the handset, this being a manner suitable for the limited storage and processing abilities available.

The principles and operation of a roaming support infrastructure, network preference selection apparatus and update system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which illustrates a remote preference unit 10 for influencing visited network selection by roaming mobile units 12, according to a first preferred embodiment of the present invention, which is a generalized embodiment. The preference unit 10 comprises a probe part 14 which may be part of a signaling relay and which picks up passing signals to carry out detection of roaming activity by mobile units such as unit 12 in a roaming environment 16 such as a foreign country to which home network 18 does not extend. Home network 18 is the network of which the roaming unit 12 is subscribed. The roaming environment 16 has a number of mobile networks 20.1..20.n which are technologically compatible with roaming unit 12 and which roaming unit 12 could use. As none of the mobile networks is a home environment there is no intrinsic reason why roaming unit 12 should select any one of the networks over any other and it is likely to simply select a network at random and then continue to select that same network for the duration of its stay in that country as long as that first selected network remains available.

The preference unit also includes a database 22 which lists the available networks 20.1..20.n in an order of preference, that is to say an order of preference for selecting between available networks, network 20.1, network 20.2 etc in the environment 16 that the roaming unit 12 finds itself. The order of preference is typically set by the provider of the home network 18 and may be set according to technical reliability or tariff or any other criterion. The database may be updated at periodic intervals due to changes in conditions and the like. In a preferred embodiment the database is combined with logic circuitry to automatically select the preferred network in reaction to real time changes. As will be explained in greater detail below, the logic can use a set of criteria. The criteria may include such items as for example:

(1) desired % of roaming distribution
(2) persistency
(3) time management
(4) community-based profiles.

The preference unit has an output port 24 which again may be part of the relay, and is associated with the database 22. In use the probe detects roaming activity being reported to home network 18. Typically the roaming activity that is reported is made at an initial attempt by roaming unit 12 to log on in environment 16. In order to accept a log in attempt as a roamer, a roaming network determines which is the roaming device's home network and passes on details of the roaming device to the home network. The home network checks that the roaming user is authorized for roaming use and indeed exists at the home network and sends back an authorization to the roaming network to confirm the roaming connection. The probe 22 preferably detects the traffic involved in such a log in procedure, and reports to preference unit 10. Preference unit 10 determines which roaming network device 12 is currently attempting to log into and which roaming environment that network belongs to. It then consults database 22 to find out the preference order for available networks in that environment and then outputs a signal which can be used to influence network selection by roaming unit 12.

It is noted that the output signal can be sent as soon as roaming is detected. Additionally or alternatively the signal may be sent at a later time. For example unit 12 may remain in environment 16 for some time. Thus it is possible to retain the information that unit 12 is roaming in environment 16 and either send a signal at a later time, or send an initial signal upon first detection of roaming and later update signals at later times.

Figure 2:
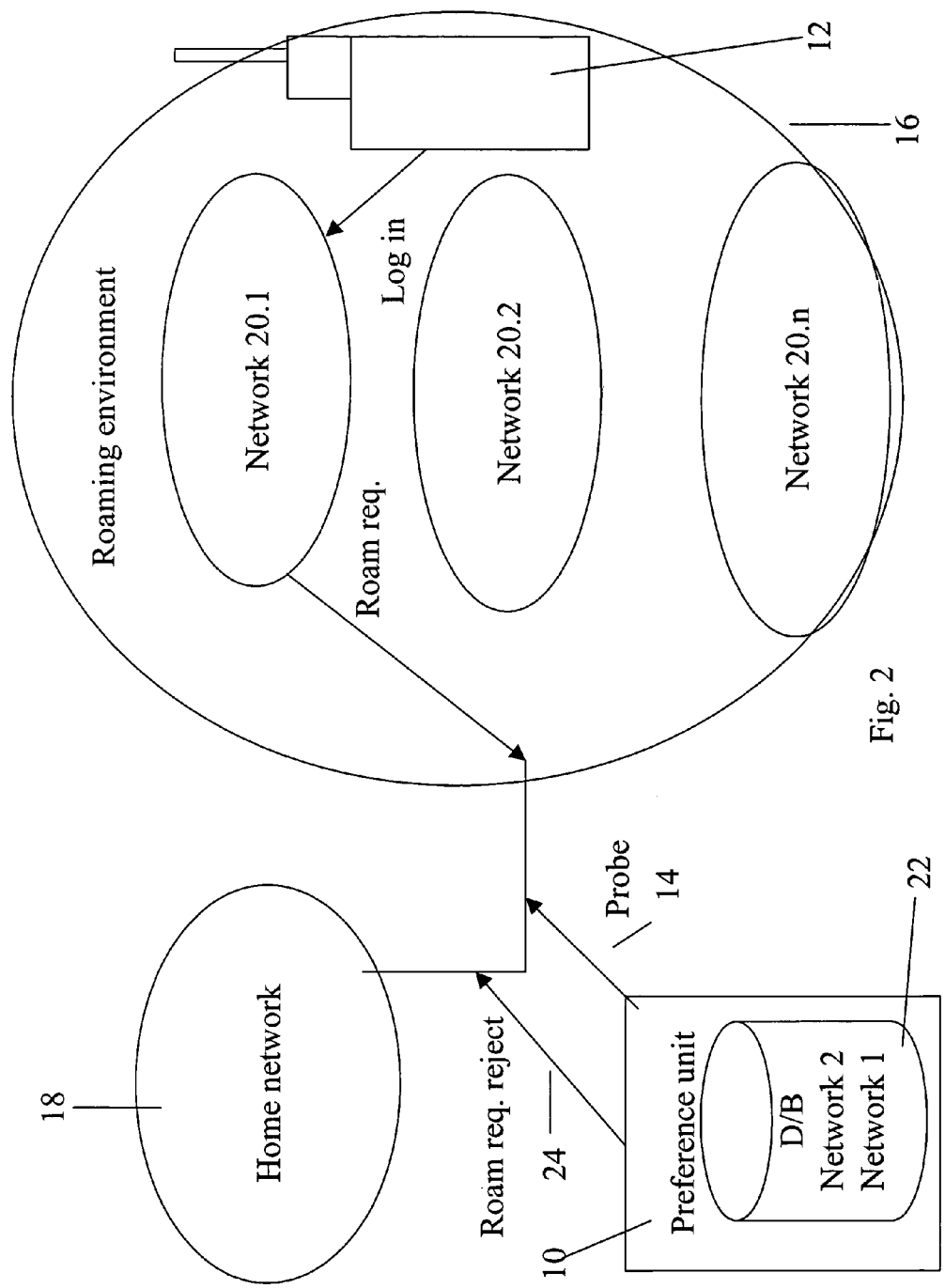
FIG. 2 is a simplified diagram showing the unit of FIG. 1 modified for achieving selection of a preferred network by forcing a new log-in operation by the roaming unit.

Reference is now made to FIG. 2, which is a simplified diagram illustrating a first modification of the roaming preference unit 10 of FIG. 1. The modification shown in FIG. 2 is the rejection embodiment referred to above. Parts that are the same as in FIG. 1 are given the same reference numerals and are not referred to again except as necessary for understanding the present embodiment. In FIG. 2, the mobile unit 12 attempts to log on to network 20.1. Network 20.1 accepts the log-on as device 12 is compatible therewith, identifies the home network as being network 18 and sends a roaming request (roam req.) to the home network. Roaming preference unit 10 eavesdrops on the roaming request signal via probe part 14, which in this case is a part of relay that constitutes probe 14 and output 24. The probe detects from passing update location request signals that device 12 is trying to log on to network 20.1 in environment 16. Preference unit 10 then consults database 22 and determines that network 20.2 is in fact preferred over network 20.1. The preference unit therefore outputs a roaming reject signal to network 20.1 and device 12 fails to complete the registration. Device 12 is thus forced to try again. If it chooses network 20.2 then preference unit 10 does not interfere and the roaming request is accepted. If it chooses network 20.3 then the rejection is repeated and so on until the roaming device selects the preferred network. The algorithm is explained in greater detail below.

Figure 3:
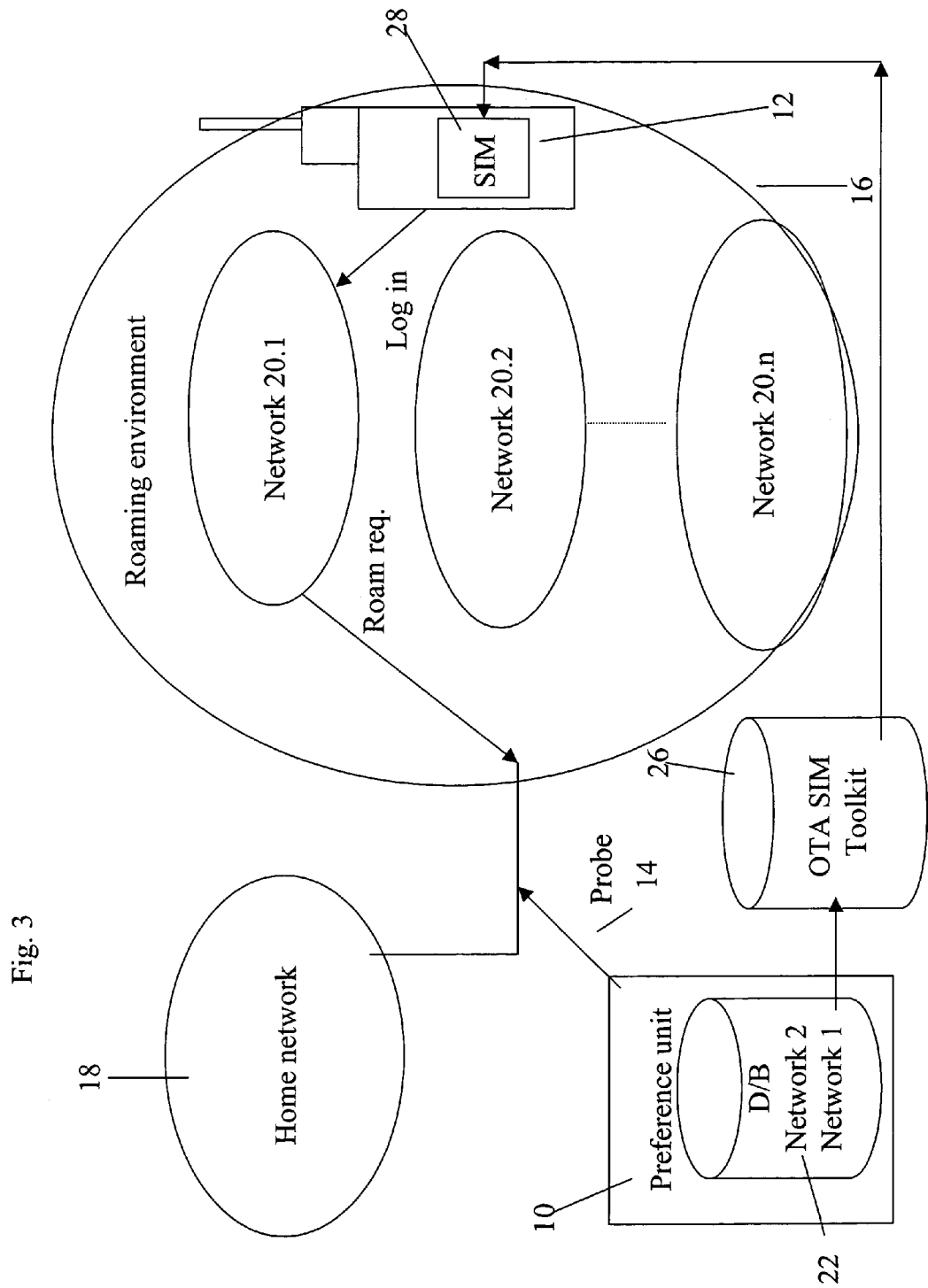
FIG. 3 is a simplified diagram showing the unit of FIG. 1 modified for influencing selection of the preferred network by sending a preference list of available networks to the roaming unit.

Reference is now made to FIG. 3, which is an alternative modification of the preference unit of FIG. 1, the SIM update embodiment referred to above. Parts that are the same as in previous figures are given the same reference numerals and are not referred to again except as necessary for understanding the present embodiment. In FIG. 3, the preference unit 10 is connected to over the air (OTA) SIM toolkit server 26, which is a server that can update SIM cards 28 with new programming settings, small user clients and the like. Typically it is used to allow a service provider to upgrade his subscriber base but its use is limited by the fact that SIMs are typically small capacity devices. The OTA SIM toolkit typically uses binary SMS messages or GPRS or the like to update the SIM. In the prior art the OTA SIM toolkit is provider initiated and does not interfere with the standard user operations, such as making and receiving calls. . In the embodiment of FIG. 3 it is actively controlled by the preference unit 10. Control is as follows. An existing roaming connection is detected The preference unit determines which network and which roaming environment is in question and consults database 22. The relevant part of database 22 is then made available via OTA SIM toolkit to SIM card 28 of mobile unit 12. The relevant part contains the roaming networks in that specific environment, typically a country, but may optionally include networks of neighboring countries so that if and when the roamer crosses the border, the list previously downloaded still covers the new country. For subsequent attempts at log on, the mobile unit 12 can then consult its own SIM card to find out the order of preference for the local networks and try each in turn. As mentioned above, the downloaded data may go beyond the list itself and may include modifying other files etc. In the embodiment of FIG. 3, the preference unit thus acts as a bridge between telephony including data services on the one hand and the infrastructure for updating SIM cards on the other hand, thereby for the first time enabling real time updating of SIM cards in accordance with actual events involving the given mobile unit.

As discussed, the connection to the SIM card is operable to download the up to date version of the preference data using for example binary SMS or GPRS. In the embodiment of FIG. 3, the mobile unit is passively detected connecting up or logging on to a given roaming environment. The initial log in may be via a non-preferred network. However the updated list that is downloaded into the SIM is not consulted until the next log on attempt, and typically requires a power on or a SIM Initialization operation to take place for the files to be operational.

Figure 4:
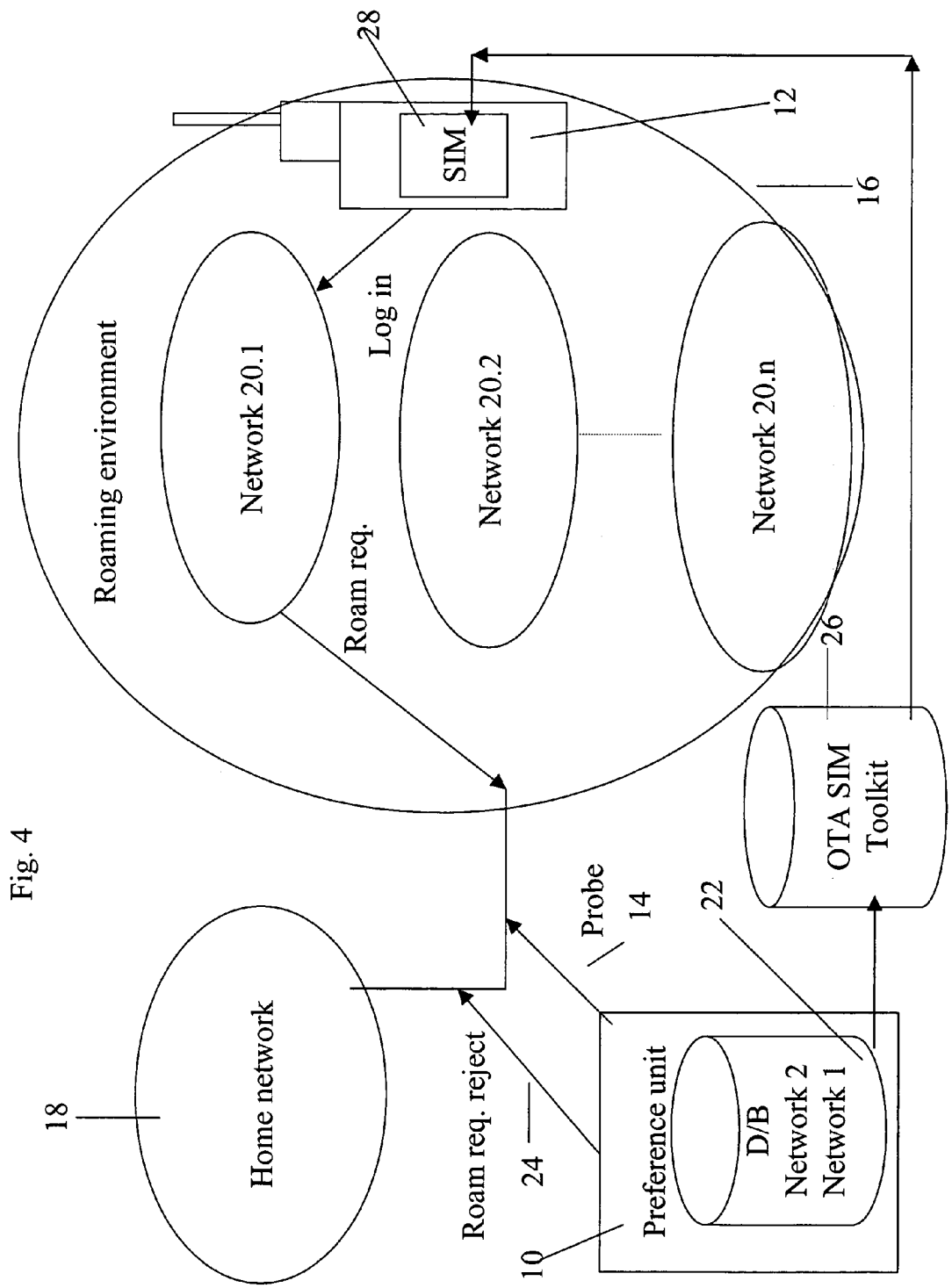
FIG. 4 is a simplified diagram showing the unit of FIG. 1 modified for both sending a preference list to the roaming unit and then forcing a new log in operation in accordance with the list.

Reference is now made to FIG. 4, which is a simplified diagram illustrating a further modification of the embodiment of FIG. 1 in which the two modifications of FIG. 2 and FIG. 3 are combined, the above-mentioned integrated embodiment. Parts that are the same as in FIGS. 2 and 3 are given the same reference numerals and are not referred to again except as necessary for understanding the present embodiment. In FIG. 4 there is both a roaming request reject signal 24 and a SIM update path involving OTA SIM toolkit 26 and SIM 28. In the embodiment of FIG. 4 an attempt to enter roaming environment 16 is detected via a certain network. The probe 14 together with output 24 forms a signaling relay. Probe 14 preferably detects the roaming request traffic and signals to the preference unit that mobile unit 12 is roaming within roaming environment 16. If the current network is not the preferred network then a roaming reject signal is sent back to the network that mobile unit 12 is attempting to connect to. Mobile unit 12 is thus forced to repeat the logging on process as before, until it gets to the preferred network. Once it is logged on to the preferred network, then the preference unit 10 consults database 22 and sends updated preference information via the OTA SIM toolkit 26 to SIM 28 as before, at some time during the newly started data session.

In order to achieve the above there is provided a mobile infrastructure which includes a signaling path, such as SS7 or MAP for passing control data for individual mobile telephony connections between networks. There is also a SIM path for passing binary data for updating control information at a programmable card at an individual mobile unit. The SIM path is typically the OTA SIM toolkit path. In addition the preference unit provides an operable connection between the two paths which enables data obtained from the signaling path, such as the roaming request, to be used to activate the update operation via the SIM path.

Figure 5:
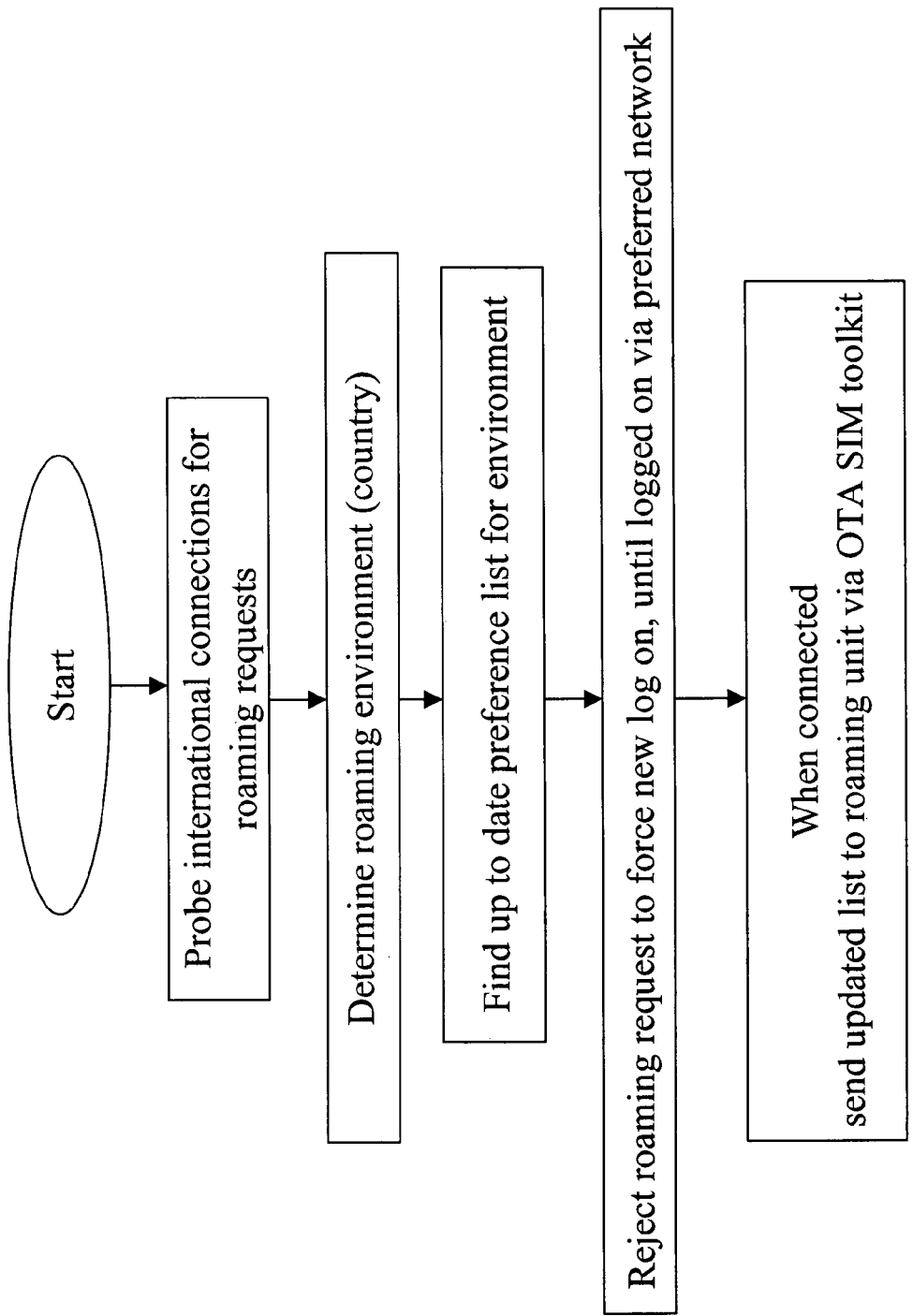
FIG. 5 is a flow chart showing the preferred operation of the embodiments of FIGS. 3 and 4.

Reference is now made to FIG. 5, which is a flow chart indicating the operation flow of the embodiments shown in FIGS. 3 and 4, in practice the combination of the SIM card update embodiment and the log-on rejection embodiment, the integrated embodiment. The flow chart indicates an updating method for updating programmable settings on a mobile telephone unit. The method comprises probing connection control signaling between the mobile telephone unit and mobile network infrastructure, looking in particular for roaming request signals. If a roaming request signal is found then the roaming environment from which the request originated is preferably determined. Typically this would be the country in which roaming is taking place. Typically the environment has a number of usable networks and the home network has an order of preference for these usable networks. Updated network preference information for the environment is obtained first of all used to decide whether to accept the current log-on attempt. If the log on attempt is not being made via the preferred network for that environment then the attempt is rejected in one of the ways described above. Once successful roaming log-on has begun then the preference list for the country (plus data for neighboring countries and other information as desired) is downloaded as a binary SMS message, or via GPRS or the like, to the SIM of the roaming unit. Thus the roaming unit receives up to date information for its programmable settings.

It is stressed that the signaling used to activate the SIM update procedure need not be an update location request but rather any control or signaling data that indicates that the user is currently roaming. Furthermore the skilled person will be aware that the data uploaded to the SIM need not be restricted to network preference data. Rather any kind of setting data can be uploaded to the SIM in response to detection or a roaming connection so that the mobile unit can be updated with program settings that are relevant to its current activities. For example the roamer could be updated with codes to obtain local services.

Figure 6:
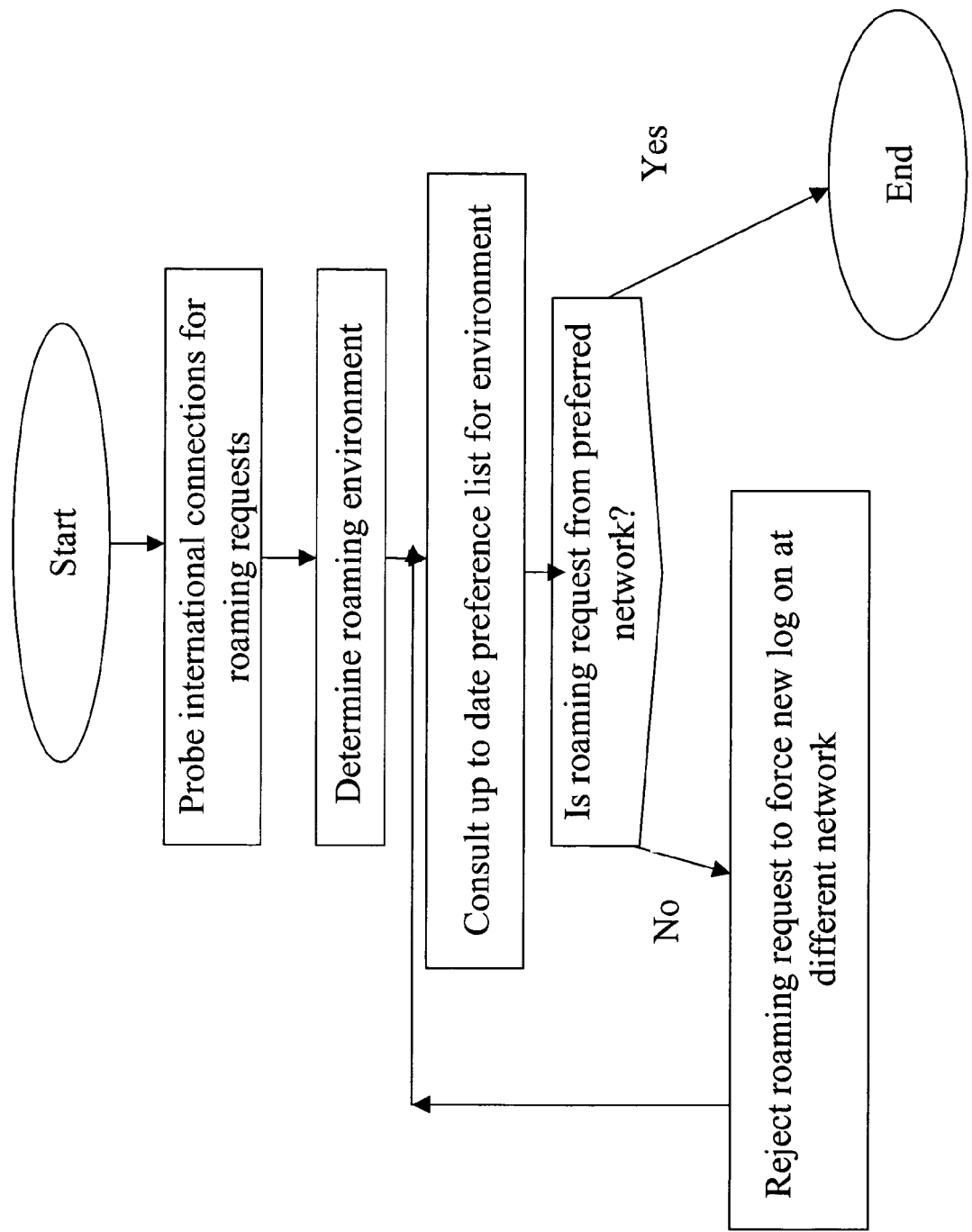
FIG. 6 is a flow chart showing the preferred operation of the embodiments of FIG. 2.

Reference is now made to FIG. 6, which is a simplified flow chart illustrating the operational flow of the rejection embodiment of FIG. 2. In FIG. 6 the operational flow provides a roaming network selection influencing method for influencing mobile units regarding network selection when connecting in a roaming environment having a plurality of available networks, as described above. The method comprises first of all probing roaming connection control signaling between the mobile telephone unit and the mobile network infrastructure to obtain an indication that a given unit is attempting a roaming connection from a given roaming environment. The method further comprises checking a database which gives a preference order amongst the available networks in the given roaming environment. If the roaming unit has connected via the preferred network then no further action is taken. However, if the roaming control signaling indicates that the mobile telephone unit is currently logged in via a non-preferred network, then the method involves rejecting the roaming request as described above, thus causing the mobile unit to find another network within the environment to reattempt logging on. The new roaming request signal is checked and the procedure repeats itself until the unit final logs on via the preferred network. Many handsets have a constant value setting which limits the maximum number of retries. This constant value is significant. It is usually three and can be modified per network and even per subscriber if there is a need. If the limit set by the constant is reached, then typically the handset enters into a long wait period, and will not retry other networks until the wait period is over. Reaching this limit is thus preferably avoided. One way of avoiding exceeding the limit is to accept any network at the final allowed attempt.

The procedure of the rejection embodiment of FIG. 2 is now considered in greater detail.

As explained, network operators may wish to have control over the automatic network selection-process taking place when their subscribers travel abroad and try to register at a visiting network (VPLMN).

The purpose of this service is to enable the home network (HPMN) of the mobile subscriber, to effect or influence visited network (VPMN) selection, whilst roaming.

The technical solution given below is targeted for GSM roaming, although the skilled person will appreciate that the principles can be adapted to CDMA and TDMA networks.

Figure 7:
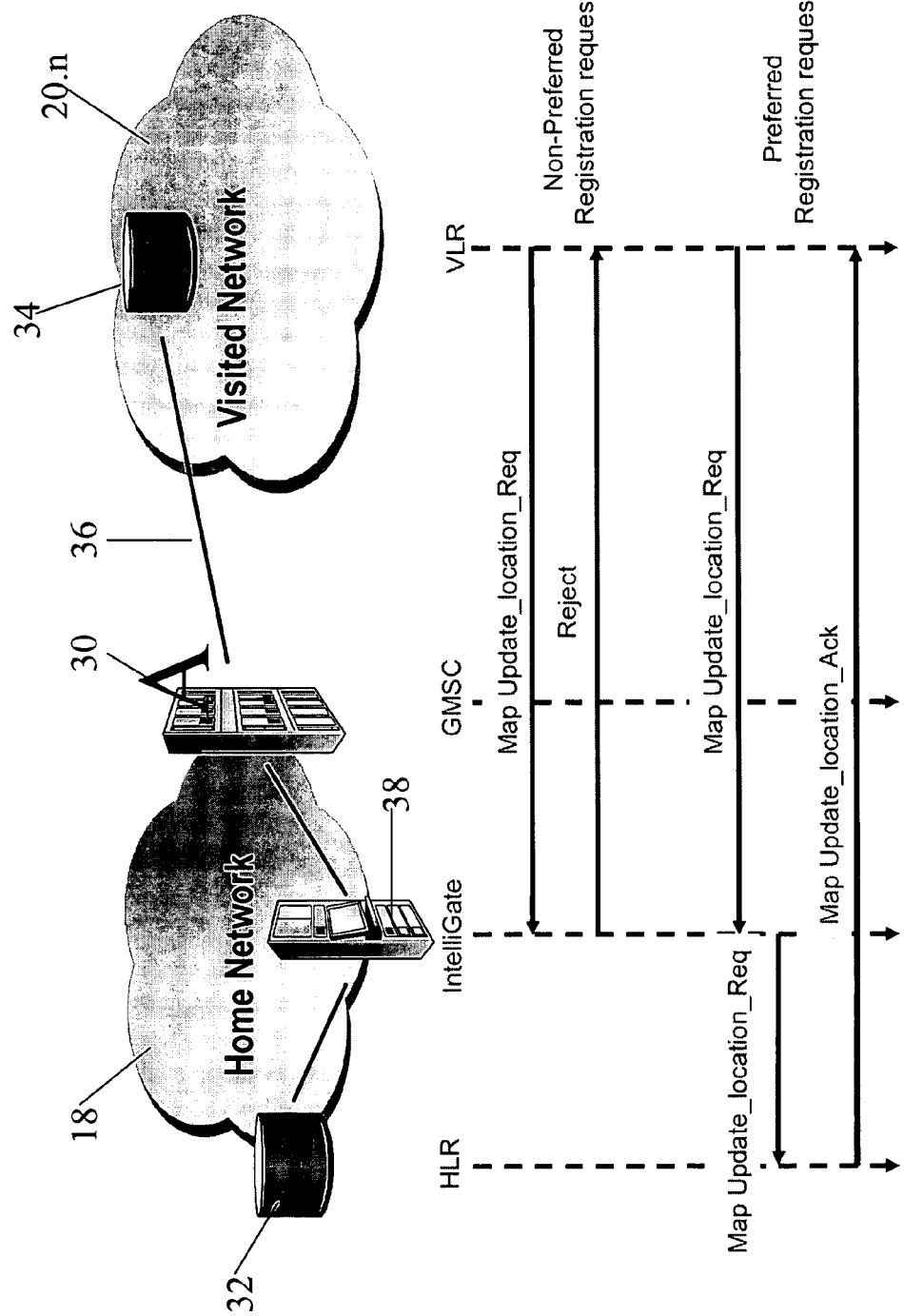
FIG. 7 is a more detailed illustration of the system infrastructure and showing signaling exchange between the various nodes of the infrastructure during a successful roaming location update process.

Reference is now made to FIG. 7, which illustrates a preferred architecture for implementation of the embodiment of FIG. 2. In FIG. 7 an SS7 signaling platform 30 is configured as a signaling relay between the home location register HLR 32 of home network 18 and the visitor location registers VLR's 34 of foreign network 20.n on which the roamer happens to have alighted. That is to say platform 30 is connected to the international SS7/MAP links 36 which are the International signaling and control lines, on one side and to the HLR 32 on the other side. It is noted that the connections at either side to the SS7/MAP links need not be direct to the location registers but there may be relays such as intelligent gateways when intervene. The platform database includes a preferred network list for each of the potential roaming regions.

The service works according to the following procedure:

The handset makes a connection to one of the available networks in the region in which it is roaming. Upon successful selection of the given network an update location (UL) request, which is a request to connect from abroad as a roaming handset, is sent from the foreign network's VLR to the home network. All such Update Location requests arriving from the foreign VLR's are processed by the Home Network.

The embodiment compares the requesting VLR against the preferred network list for the corresponding region or country.

If the roaming network and corresponding VLR are the preferred network in the visited country then the request is relayed to the HLR for the standard procedure and no action is taken by the present embodiment.

The following terminology is used herein:

Rejection—a rejection response of any type to an Update-_Location request

Acceptance—an acceptance of an Update_Location request

Active Rejection—a rejection that is based on sending a rejection message.

Passive Rejection—a rejection that is based on ignoring the UL request.

Redirection—an attempt of the application to redirect a handset to the preferred network. A redirection session includes a set of Update_Location requests and their associated responses that include at least one Rejection and must end with an Acceptance.

Successful redirection—a Redirection session that ends with registration to the preferred network.

Unsuccessful redirection—a Redirection session that ends with registration to a non-preferred network.

Deactivated VPMN—a VPMN upon which no redirections are applied, i.e. any attempt to register to a deactivated VPMN shall be accepted regardless its position in the list of PN.

Preferred Network—the network with the highest allocated roaming share (in %)

General Flow

Figure 8:
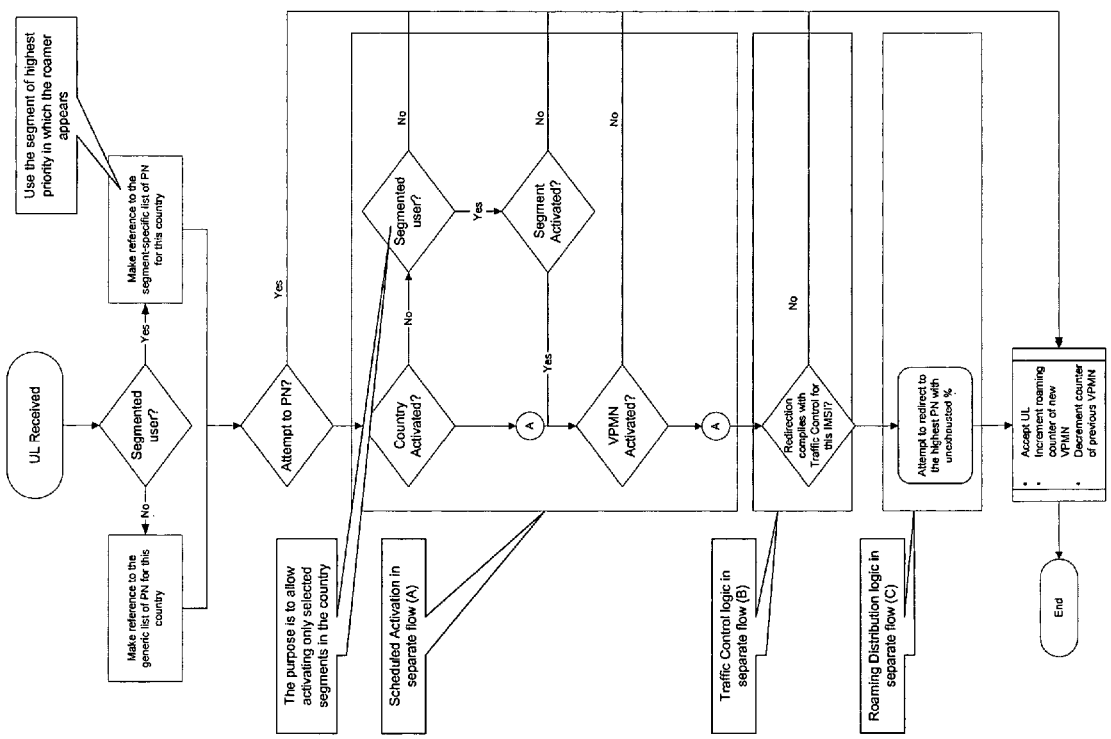
FIG. 8 is a simplified flow chart illustrating a preferred procedure for providing preferred network lists differentially to users belonging to different segments.

Reference is now made to FIG. 8, which is a simplified flow chart illustrating general logic flow for the present embodiments.

Following are the main stages of the logic starting with receipt of an update location request from the SRM. A more detailed flow of each stage is presented in the following sections.

Stage 1—Load Preferred Network (PN) List

Load country specific or user-segment specific PN list to the logic.

Stage 2—Activation Filter

If the handset (HS) attempts to register to a non PN then check if the Intelligent Preferred Network is activated for the visited country and network at this day and time.

Stage 3—Traffic Control Filter

Global Traffic Control—Check that the number of rejections sent to the attempted VPMN meets pre-defined criteria.

Personal Traffic Control—Check that the number of redirections made to the given handset meets pre-defined criteria.

Stage 4—Roaming Distribution Test

Decide whether to reject or accept (relay) the UL based on the current roaming distribution compared with the desired one.

Country Profile

List of Preferred Networks

Using the provisioning interface the operator is able to provision the PN list for each visited country in a descending order of priority. That is the application automatically reorders the list according to the provisioned roaming distribution, as discussed in more detail below.

The PN list typically includes only networks that have a roaming agreement with the home network operator.

Rejection Types

Any combination and order of the following rejection types can be globally applied:
 Update_Location_Reject (System Failure)
 Provider_Abort
 Update_Location_Reject (Roaming Not Allowed)
 Ignore Combinations can be provided separately per country as follows:
 Any combination and order of the above rejection types can be applied to roamers in a specific country as part of the country profile.

It is preferably possible to define the settings at one country and apply them to all countries.

Persistence Management

It has to be assumed that in some instances the conditions for succeeding in selecting the preferred network will not exist. This case is more probable when using the rejection embodiment. An example is when the preferred network does not have the necessary air-link coverage in a certain area or at a certain point in time. Another example is when the roamer tries to manually select a non-preferred network.

In cases such as the above examples, the application stops after applying a pre-configured retry scheme, accepting the requested network regardless of its position in the list of PN.

Using the provisioning interface as discussed herein, the operator is preferably able to configure for each country the maximal number of rejections per redirection session. The choices shall be limited to 1, 2 or 3 rejections per redirection.

It is preferably possible to define the settings for one country and then apply them to all countries, all in one command.

Service Activation

Using the provisioning tool, the operator is preferably able to configure per visited country whether to activate or deactivate the Intelligent Preferred Network overall. The default state for the service is preferably the activated.state If a given country is deactivated then in one implemention all VPMN's in the country may be deactivated. In an alternative implementation only some VPMN's may be deactivated.

General

Using the provisioning tool the operator is preferably able to activate the intelligent preferred network (IPN) in a pre-configured schedule based on combinations of the following time periods:
 Always
 Weekdays
 Weekends
 Working/peak hours
 Leisure/off-peak hours
 The default is preferably always.

Logic

In one configuration, if a particular country is scheduled or activated then all VPMN's in the country are scheduled or activated, that is the same schedule is applied to all of the VPMNs. In another configuration, when the country is always activated some VPMN's may be what is known as "scheduled activated". If a VPMN is "scheduled activated" that means that outside of the schedule times it is deactivated.

Time Zones

Time management, for example for the scheduling explained above, is preferably based on the visited country's time zone. Area based time zones are also a possibility.

Roaming Distribution

Using the provisioning interface the operator is preferably able to allocate percentages of its outbound roaming to the different VPMN's of each visited country.

For Example:
65%—to network A
20%—to network B
10%—to network C
5%—to the rest

The application preferably verifies that the total percentage is not different from 100% and prompts the operator accordingly.

Figure 9:
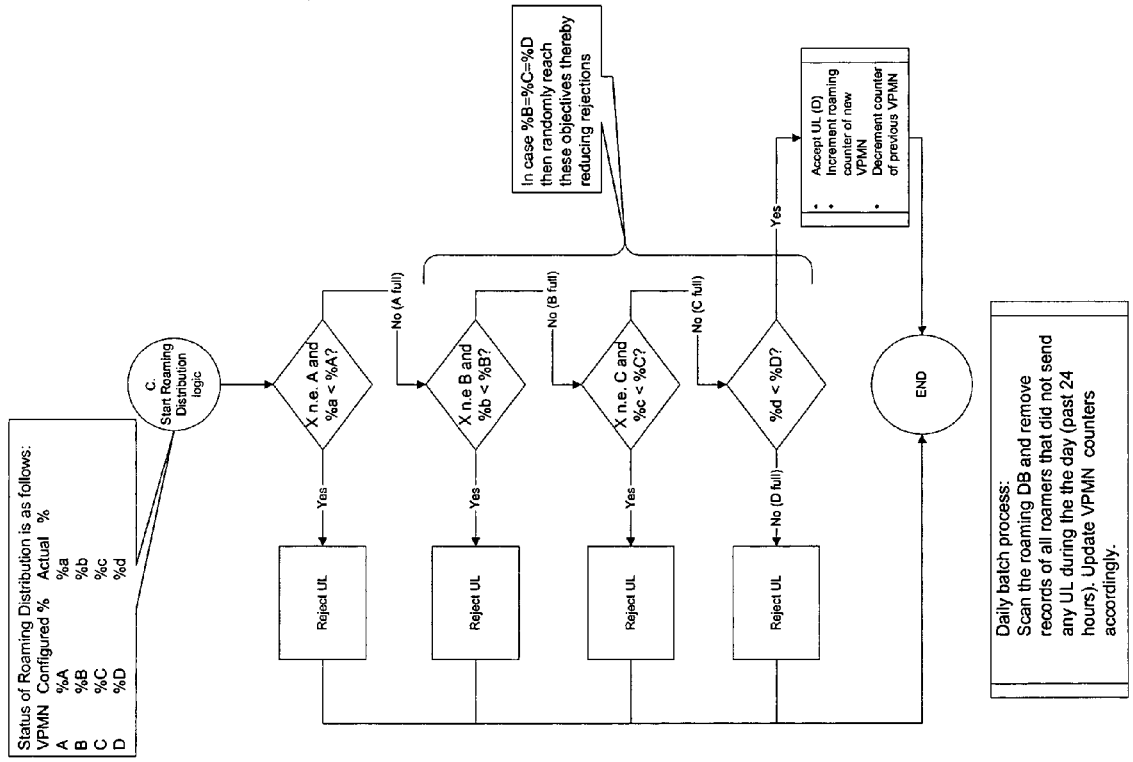
FIG. 9 is a simplified flow chart illustrating a preferred procedure for applying users to different networks according to current utilization levels of the networks.

Reference is now made to FIG. 9, which presents the requirements of Roaming Distribution and its impact on decision making in the rejection embodiment. In order to follow FIG. 9 it should be assumed that the preferred network is A and the actual distribution status at time of receiving a given update location request is as described in the figure. The current handset thus attempts to register to a VPMN X. Now if X=A then the request is accepted regardless of the percentage already assigned to A.

- If A has not yet been filled with the pre-assigned percentage and X does not equal A then the system preferably rejects the request, so that the current handset eventually gets to A.
- If A already has the pre-assigned percentage and the handset selects the next preferred network B, that is X=B then if X=B the selection of B is preferably accepted regardless of what % has already been allocated to B.
- If the home network operator allocates percentage use evenly to all networks other than A then the system preferably fills B, C and D randomly until they are filled with their pre-assigned percentage, thereby avoiding unnecessary rejections.
- The number of roamers in each network that is used by the system is preferably a momentary snapshot correct at the time of decision making. Roamers that move from network to network preferably immediately cause numbers to change.
- Roamers who leave the country are preferably removed from the system after T hours (daily) of no Update Location events. For this purpose a database clean-up batch process is preferably performed once per N hours.

The operator is preferably able to view the actual status of the roaming distribution in comparison with the pre-configured settings.

Refresh Management

Refresh management applies to the embodiments in which files are downloaded to SIM cards. The operator is able to configure the application to initiate a refresh operation in order to update preferences under any of the following conditions:

a. Every $T_{ref}$ time
b. Ad hoc at a specific future time
c. Recurrent specific time
d. Immediate
e. As response to user activated request (e.g. by sending SMS or dialing designated short code)

Subscriber Segment Profile

General

As will be explained in greater detail below, the operator is able to provide for dealing with users in terms of grouping or communities which can be defined according to different criteria. A preferred embodiment allows around ten such groupings or subscriber segments Thus for example:

1. "Gold" users
2. Pre-paid/CAMEL users
3. Data users
4. Corporate-X members
5. Special program users
6. 3G users
7. Global segments (e.g.: teen/young/adult)
8. MSISDN/IMSI/IMEI ranges
9. SIM card numbers For each subscriber segment the home network operator is preferably able to configure the following:
  Specific list of preferred networks
  Activate or deactivate the IPN (subject to the VPMN activation and scheduled activation profiles).

Segment Priority

The segments are set according to relevant criteria, and there is no reason why any given handset user may not belong to more than one segment. In order to cope with subscribers belonging to more than one segment the home network operator may assign priority to the segments. A particular roamer is then assigned the profile of the highest priority segment in which he/she appears.

Role of the Intelligent Gateway

If, in either the rejection or integrated embodiments, during any given connection attempt, the roaming network and corresponding VLR are not the preferred network then Intelligent Gateway 38 which provides intelligent control for roaming, sends a reject response to the VLR that rejects the update location request. The intelligent gateway does this via a relay unit that provides the probing and output features discussed above. The rejection ensures that the current roaming network fails to obtain authorization of the current user as a legitimate user of the home network. The update location request thus fails, which causes the handset to try again to select a network for connection.

When a new network is selected (new Update Location request received) then steps a' and b' are repeated until the preferred network is selected, or uuntil a "max retries" limit is reached.

One way of overcoming the problem of exceeding the max retries limitation is to accept any network at the final permitted attempt.

If the non-preferred network is selected again, that is to say the same network is being repeatedly selected, then after N (pre-configured) times the application backs-off trying to redirect the handset. This may for example be a sign that there is only one network available at the given location.

After a pre-configured time-out, any new Update Location request runs the above procedure again.

As explained, the service can be operated per visited country or visited network basis. The service can furthermore be operated in order to achieve a certain success ratio only, i.e. to redirect 20% of the roamers only, as explained in detail above. Sometimes, roamers in a particular geographical area may show a certain persistency in failing to select a preferred network. This may for example be due to the preferred network not giving good proper coverage in the user's location. In such cases the preferred embodiment notices and stops trying to redirect, leaving the roamers' network selection intact.

The embodiment can be programmed to take effect at pre-defined time periods, such as during the busy hours of the day only, as discussed above under the heading of scheduling.

Given settings or a given preference list can be applied to selected users only, using the segments referred to above or in other ways. Thus the operator may provision selected users in advance, for example on the basis of data indicating heavy and light users, or on the basis of distinguishing prepaid users from postpaid users. Optionally, the application may dynamically add users to a heavy users list according to pre-defined criteria such as criteria based on the number of registration detected within a time-period. Furthermore, as explained in greater detail above, different preference lists may be used for different categories or communities of users, as desired.

In the three solutions:

International telephony control or MAP traffic is diverted to the SRM 30, so that the SRM can read the location requests. As will be explained in greater detail below, the SRM is a switching relay that can be used to combine the function of the probe and output unit as described above. In a particularly preferred embodiment only the Location requests themselves reach the SRM.

The routing to the SRM may be carried out in the home public mobile network HPMN, preferably from the GSTP or gateway STP, the central entrance point for signaling transactions to the network.

A practical solution needs to have sufficient redundancy to provide high availability In the event of a registration attempt, typically in the form of a location update request, from a preferred network, the SRM forwards the request to the HLR transparently.

In the event of a registration request from a non-preferred VPMN there are three alternative solutions, to be presented below, each of which causes the MS to search for the preferred VPMN.

Figure 10:
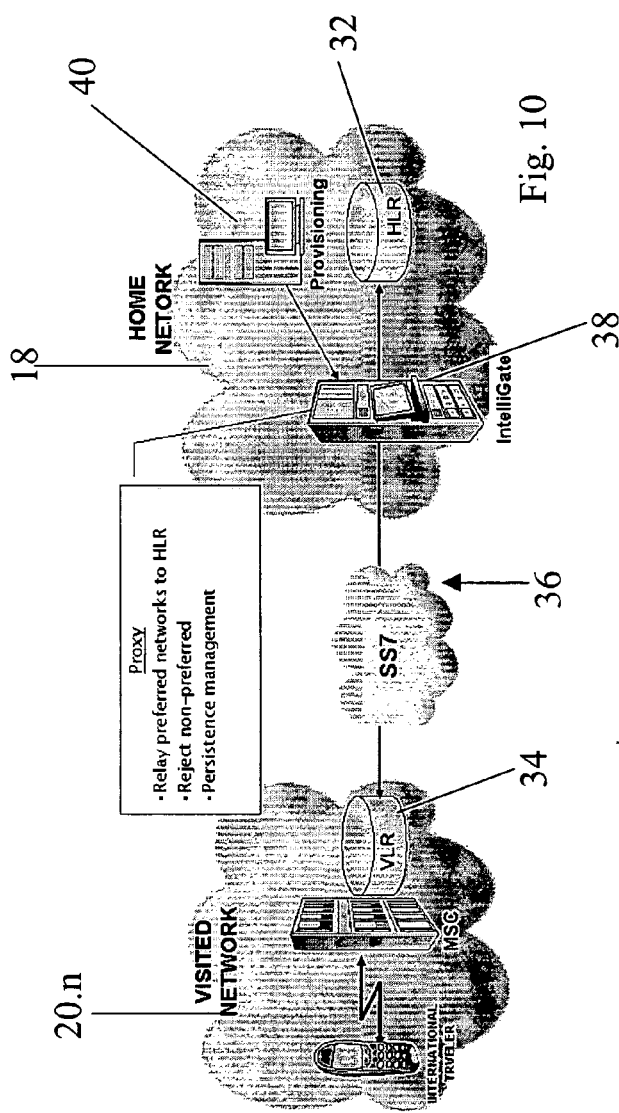
FIG. 10 is a further illustration of the system infrastructure, in particular showing a provisioning tool.

The three solutions, which have been outlined above, are now given in greater detail hereinbelow, with reference to FIG. 10, which shows the basic system architecture. Parts that are the same as in previous figures are given the same reference numerals and are not referred to again except as necessary for understanding the present embodiment. A provisioning unit 40 is associated with the intelligent gateway to configure the system for operation. The flows will be described with the following figures.

Considering a variation of the embodiment of FIG. 2, the following scenario explains call flow procedure when a mobile unit 12 requests registration in a non-preferred VPMN. In such a case the present embodiment uses the SRM 30 to terminate the connection using a MAP-P-Abort response which is a standard part of SS7 signaling. The preferred embodiment uses an abort signal that includes in the Provider Reason field "abnormal PDU". As explained elsewhere, there are other signals that can alternatively be used or the request can simply be ignored or timed out.

Figure 11:
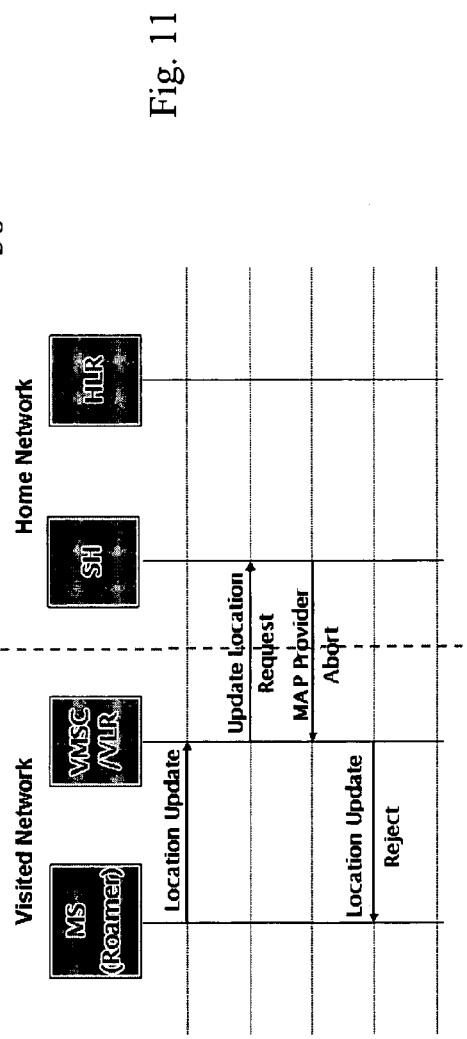
FIG. 11 is a signal flow diagram for a variation of the embodiment of FIG. 2 in which a MAP abort signal is used to prevent registration via a non-preferred network.

The transaction flow is illustrated in FIG. 11. A location update signal is sent from the mobile unit to the local network infrastructure. As the mobile unit is a roamer the local network infrastructure sends an update location request to the mobile unit's home network. The request is recognized at the SRM, here denoted SH where it is intercepted and the abort request is sent as a reply when it is realized that the request is for a non-preferred network. The abort request reaches the local network infrastructure where it is sent as a location update reject to the mobile unit.

In the case of certain rejections signals such as "roaming not allowed" the MS receives the rejection signal it preferably enters the specific VPMN it has just failed to log on to into its own VPMN forbidden list, and then looks for the next VPMN in any list it may have or selects randomly from the remaining networks.

The specific VPMN is typically erased from the forbidden list upon switch off or in the case of removal of the SIM from the mobile unit.

An advantage of the present solution is that it causes the mobile unit to search for the next VPMN in the list, eventually leading to the preferred VPMN.

Therefore a disadvantage of using the "roaming not allowed" signal in all cases arises in the case of non-coverage by the preferred network at the given locality, there is some risk that all other networks will be disqualified and then the unit may enter an "Out of Service" state until switch off in either automatic or manual network selection mode. Rather it is best to use the "roaming not allowed" signal only in the case where a particular network does not have a roaming agreement.

In another version of the embodiment of FIG. 2, it is possible for the home network to respond to an attempt to connect to a non-preferred network with another standard SS7 signal, the Update Location System Failure response. The signal flow is similar to that in FIG. 11 except that in place of a provider abort signal, a system failure response is sent. That is to say an update location reject signal is sent from the home to the roaming network which is in fact an Update Location System Failure response.

As a result the mobile unit 12 receives a "Network Failure" signal indicating error cause 17 in the standard SS7 system As discussed above, a further embodiment is for the update location request simply to be ignored. In this case there is no return signaling and the request simply times out. A disadvantage of using time out is that it may take longer than the active rejection embodiments. However it has the advantage that there are no rejection signals, reducing the signal load on the network.

The general idea of the Intelligent Preferred Network service is to give mobile operators remote control over the VPMN selection process when their subscribers roam in foreign networks. Operators can for example direct their outbound roaming subscribers to preferred roaming partner networks. The provisioning tool referred to above offers three alternative methods to achieve the desired VPMN selection depending on the operators' overall roaming technical and commercial objectives.

Figure 12:
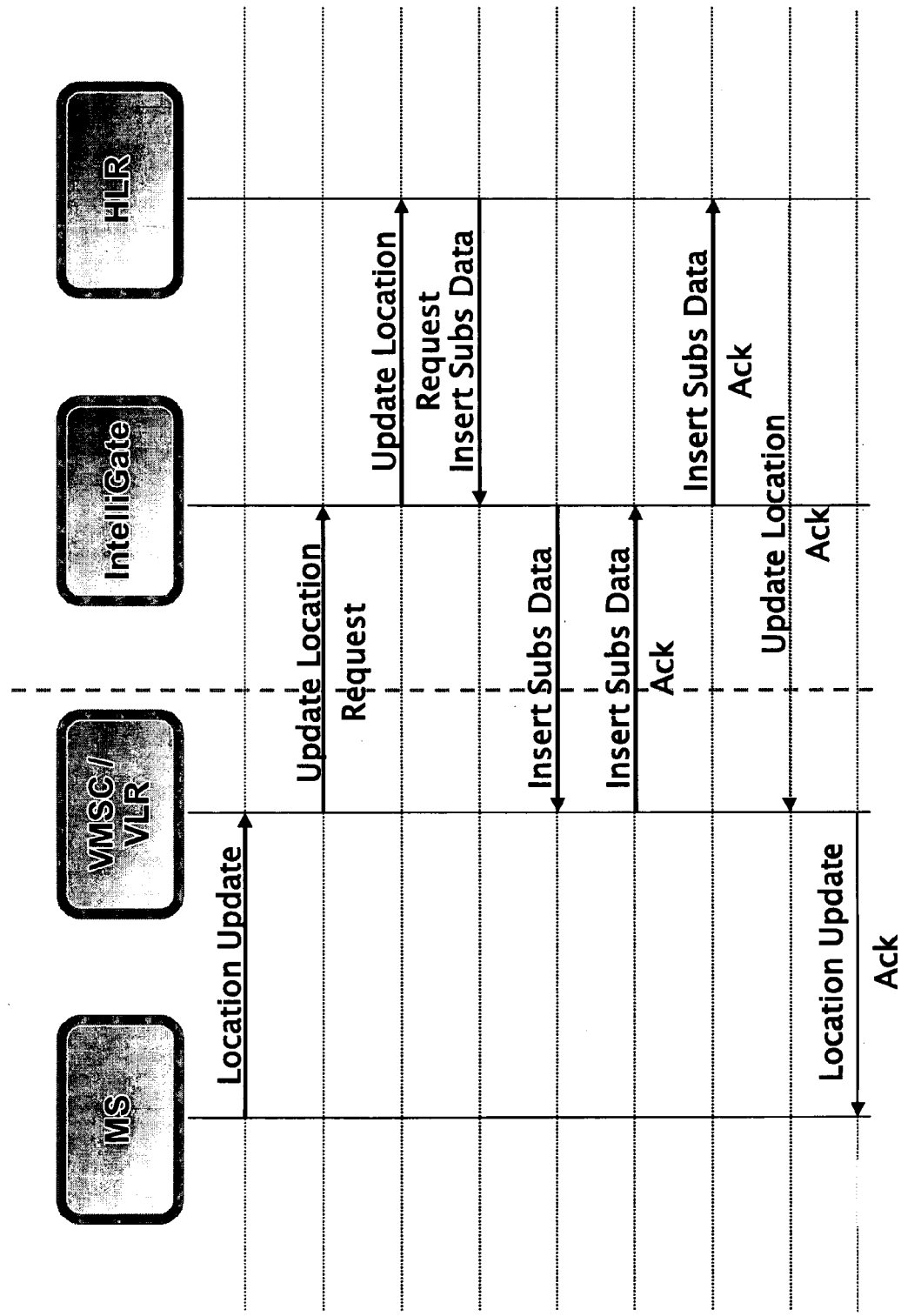
FIG. 12 is a signal flow diagram showing a successful location update procedure.

FIG. 12 is given for reference purposes and indicates the signal flow in the handshake procedure for a successful update location request. The mobile station issues an update location request via a network it finds at the roaming location. The request is passed on via an international signaling route, eventually reaching the intelligent gateway of the user's home network from which it is passed on to the home location register (HLR) of the user's home network, where registration takes place. The HLR responds by requesting subscriber data from the roaming network which is sent and then an update location acknowledge signal is sent back to the mobile unit, indicating to all of the stages on the way that need to know, that the procedure has been successful.

Figure 13:
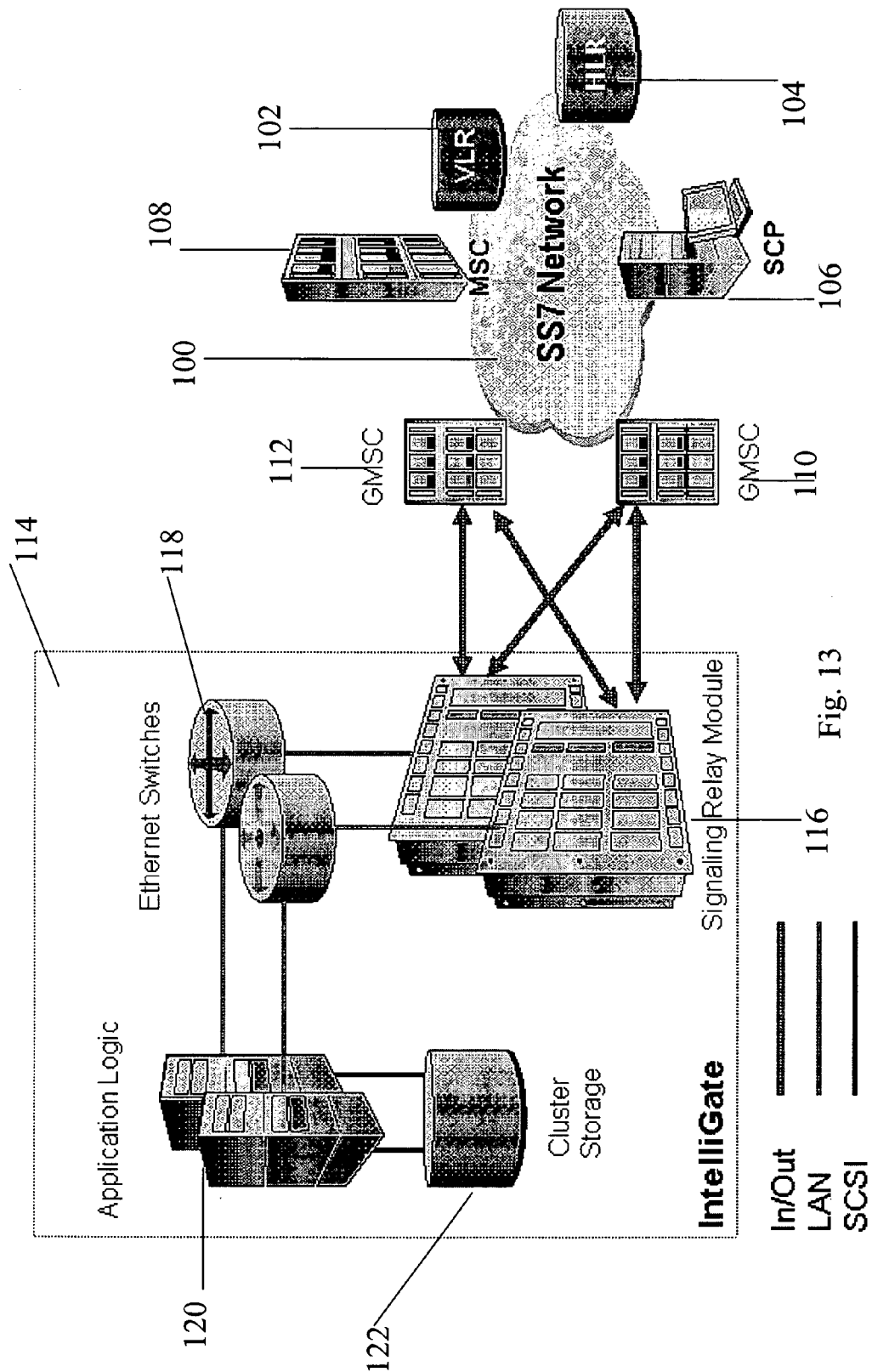
FIG. 13 is a simplified diagram showing a signal relay module included within an intelligent gateway.

Reference is now made to FIG. 13, which is a simplified diagram showing an intelligent gateway connected at a home network and including a signal relay module, the SRM referred to above, which is a preferred implementation of the probe and output relay. In FIG. 13 an SS7 signaling network 100 links a visited location register VLR 102, a home location register 104, a service control point SCP 106, an MSC 108, a first gateway MSC, GMSC 110, a second GMSC 112, and an intelligent gateway 114 which, as mentioned above is a feature that carries out roaming management. The intelligent gateway 114 includes the signaling relay module (SRM) 116 as well as Ethernet switches 118, application logic 120 and storage capacity 122.

The high level requirement of an SRM is to obtain and carry out control tasks on specific messages passed by the SS7 control network before they arrive at their final destination. Generally speaking there two major ways to carry out such a requirement over an SS7 network:

1) A relay" connection, in this case all traffic is routed via the SRM, in which case the SRM acts as a tandem switch.

2) As a Service Node connection: In this case, specific messages are routed to the SRM before they reach the final destination. The SRM then forwards the messages after activation of its own services.

Firstly, considering the relay connection in greater detail, the SRM preferably has the ability to interconnect within the network invisibly, that is so that each of the connection nodes are not aware that the SRM is connected in between. To achieve this aim the SRM should be able to own several Point Codes, addresses of equipment on the network, and the SRM, to be transparent, should preferably look like the point code at one end to equipment at the other end. The SRM therefore occupies one node and controls SCCP routing without owning a valid Global Title address, an address in ISDN format.

Figure 14:
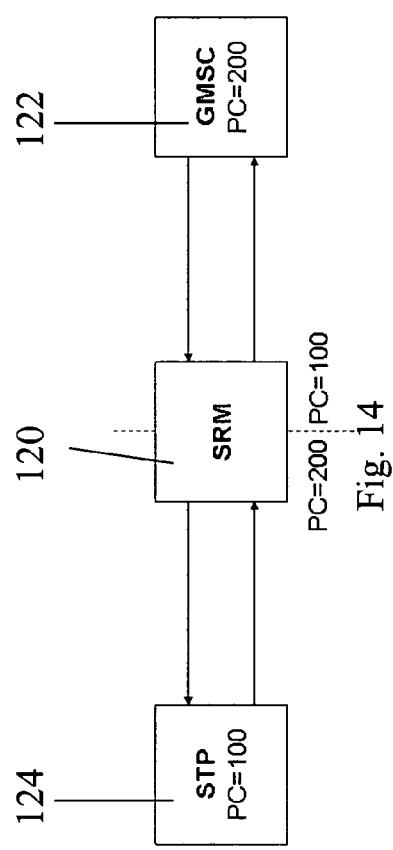
FIG. 14 shows a first configuration for setting up a signal relay module as part of a network.

Reference is now made to FIG. 14 which shows how an SRM 120 can be connected to intervene between two signaling nodes 122 and 124. Signaling node 122 is a GMSC, and node 124 is an STP. In this method the SRM is connected serially to the intercepted signaling links, means all signaling traffic is physically routed via the SRM. Such a configuration allows implementation of SRM without changing any SCCP routing rules within the hosted network.

Figure 15:
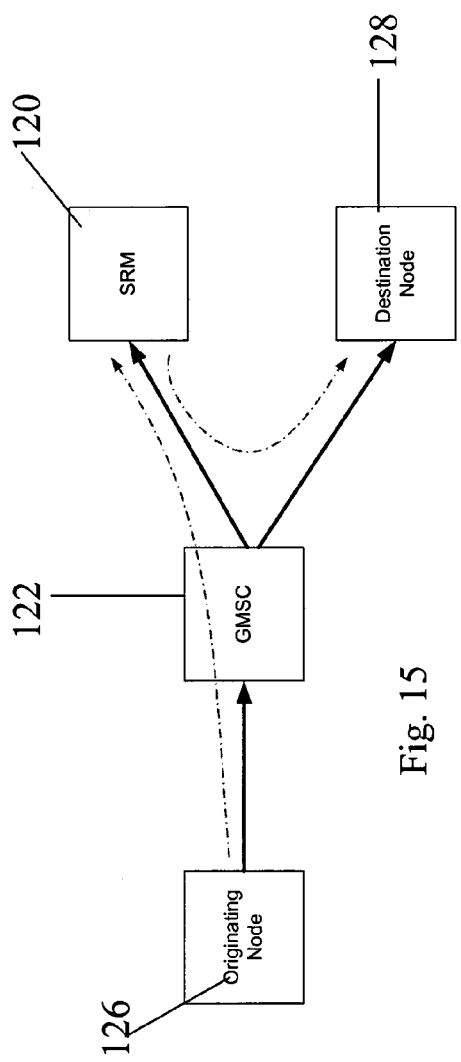
FIG. 15 shows a second configuration for setting up a signal relay module as part of a network.

The other implementation is to connect the SRM as a service node MSC in the SS7 network, as illustrated in FIG. 15. In FIG. 15 the SRM 120 does not separate between any other nodes but rather sits on a branch of its own connected to GMSC 122. Source and destination nodes 126 and 128 sit on either side of the GMSC. When connected as an MSC the SRM owns Point Code and Global Title addresses which are part of the hosted network. The host network preferably configures its GMSCs to route specific operations to the SRM.

Integrated Network Control

The following refers to FIG. 4 above, namely the integrated solution, and combines Intelligent Gateway-based remote registration control with the ability to download country-specific Preferred Lists, on the one hand with the ability to trigger the handset to resume the network selection process. Furthermore network selection can be triggered at any time rather than just during a registration attempt to a particular network. Hence the system can wait for a preferred list to be successfully downloaded to the mobile unit and then trigger a new network registration. Furthermore the operator is able to use the system flexibly and apply different methods to different events based on profiles such as: visited country/network, subscriber's community and current date & time. Such an integrated solution provides the following advantages amongst others:

firstly it provides an improved overall response time to the user, secondly, since the application knows the SIM preferences of the current user, it need not always interfere with the connection. Often a reject results in a worse alternative from the point of view of that user, and thirdly there is lower signaling traffic to/from the VPMN. This is because some users can be completely controlled by the SIM solution.

Using the Web-based user provisioning and reporting tool operators, it is further possible to customize the Preferred Network, if it happens to be an intelligent network (IN) to achieve the desired service mix and level of control in terms of activation and persistence policy. Thus such an intelligent network can configure activation criteria on the basis of such data as visited country and network, day-of-week and time-of-day, a subscriber profile e.g., "most valuable roamers", and any other configurable persistence management criteria to accommodate to transient conditions.

The functionality of the FIG. 2 embodiment was tested over a four day period and showed successful results.

Concerning the embodiments in which a list is downloaded to the SIM card, downloading only the country-specific network-list reduces the requirements of SIM memory size. At the same time it solves the problem of capacity at the handset to scan just a small number of networks from a list since the list is short. That is to say, the advantage of downloading a per-country preferred list solves the problem of keeping a worldwide list, for all countries, which is not possible since the SIM card capacity limits the list to the order of 8 or 24 items. Hence, operators currently provide in advance a small number of preferred lists, say 8, for a limited set of most popular roaming countries.

Another benefit is that a shorter list shortens the search time for the handset. The handset does not have to scan a long list.

Figure 16:
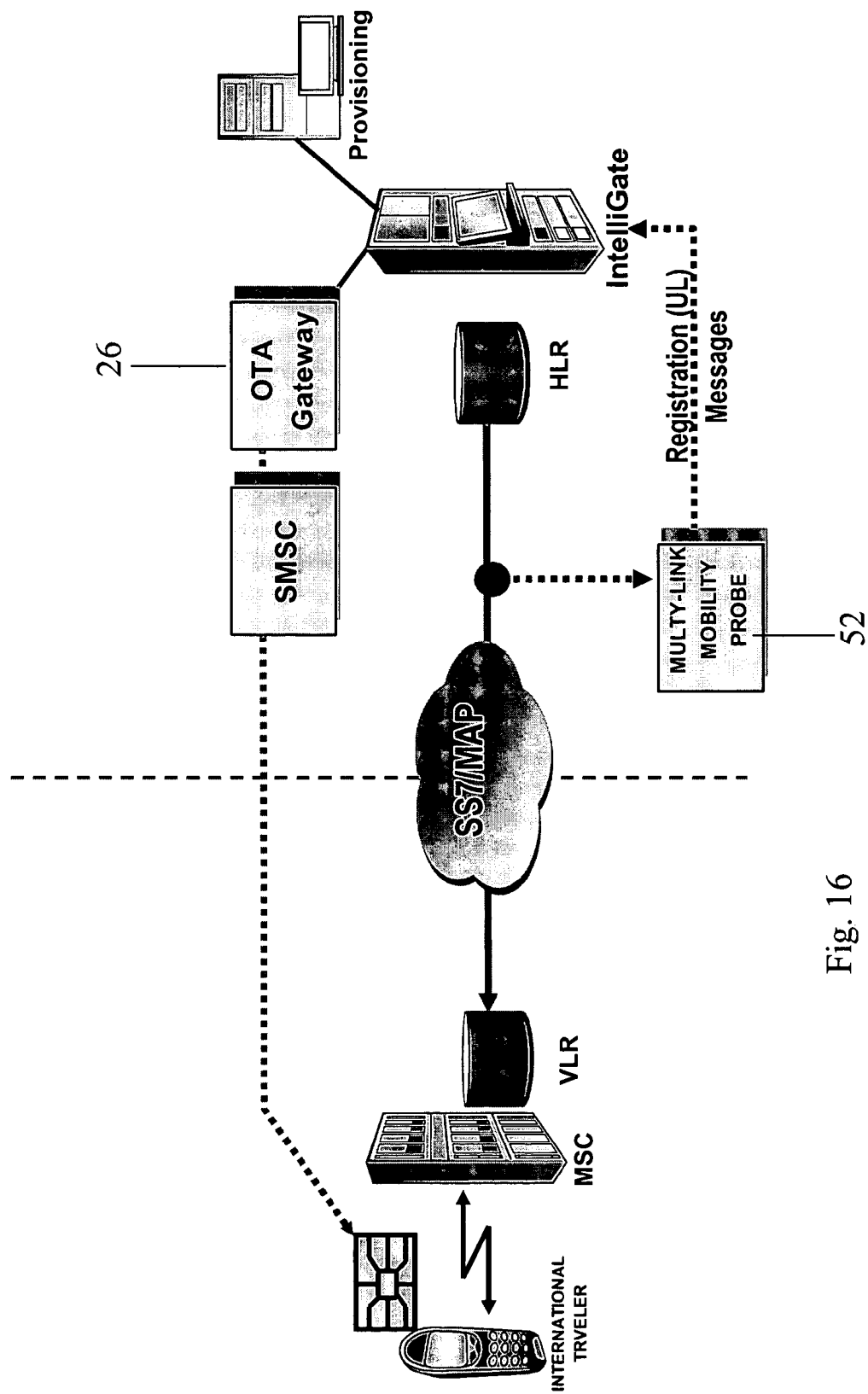
FIG. 16 is a simplified system diagram illustrating an implementation of the SIM update embodiment of FIG. 3.
Figure 17:
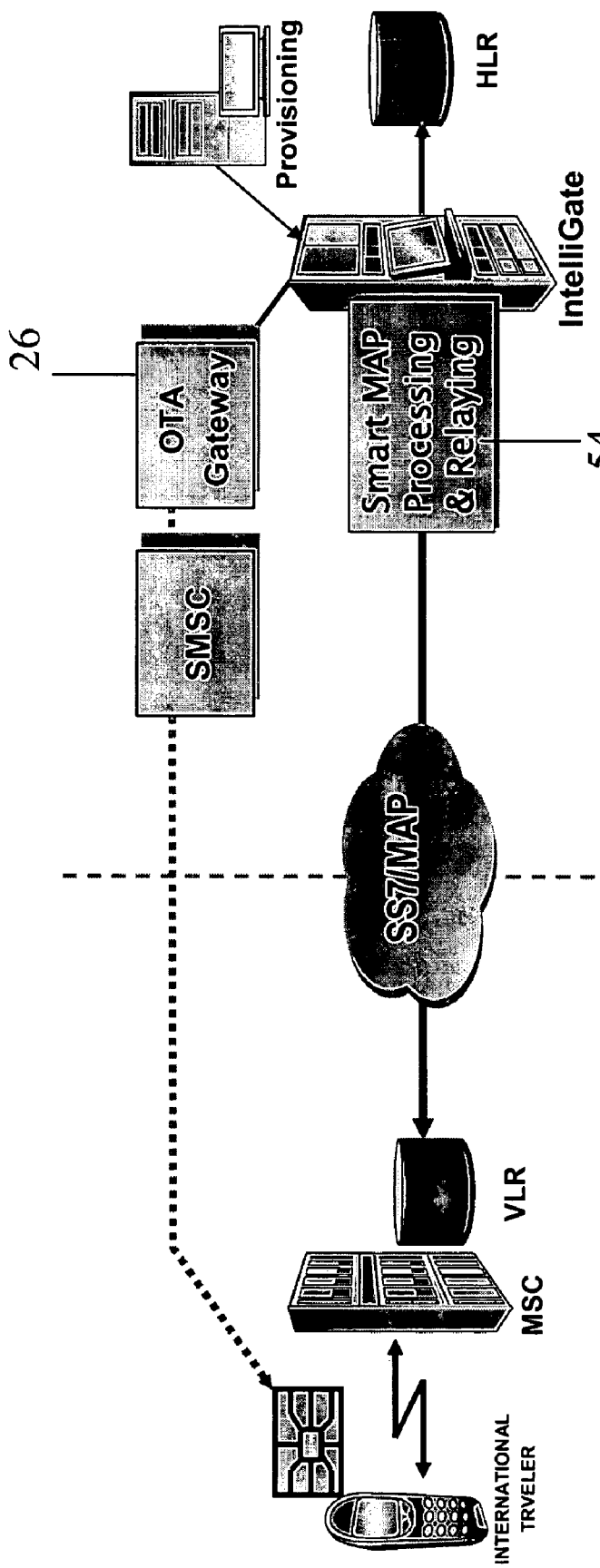
FIG. 17 is a simplified diagram illustrating system infrastructure for a preferred implementation of the integrated embodiment of FIG. 4.

The same infrastructure for downloading to a SIM in reaction to activity at a network can be used say to control the SIM-based applet in relation to other data fields such as the Registered PLMN (RPLMN). Depending on the approach for monitoring the roaming traffic two architecture variants may apply. The monitored roaming traffic is exchanged over the international MAP signaling links. Monitoring is accomplished by probe 14 which may or may not be accompanied by the ability to carry out active relaying of signals. Thus two implementations are possible. One implementation is a passive Mobility Probe and the other implementation is an active Signaling Relay Module (SRM). The choice between implementations is preferably left to the operator. FIGS. 16 and 17 depict the two implementations. FIG. 16 shows the SIM download architecture of FIG. 3 with mobility probe 50 and FIG. 17 shows the integrated solution architecture of FIG. 4 with a Signaling Relay Module 54. The OTA platform 26 is typically located either at the operator's home network or at an OTA-vendor's hosting center. A Java or like applet is installed on the SIM card, acting as a Roaming Agent. The applet may be applied to a SIM that supports Java,.

The applet contains the ability to trigger a SIM Initialization command, known as Refresh, which re-initiates the network reselection process, and thus sets the newly downloaded preference file as an active network selection preference file.

All the other SIM files referred to hereinabove can be controlled by the OTA platform directly, and do not need applet control. Thus the applet can be kept very small. That is to say all the necessary logic beyond that needed to operate the refresh is maintained by the home server application. Because the applet is small, it can be downloaded over the air and does not require SIM replacement. Other possible solutions which do not have a home server, or a probe or relay, connected to the OTA platform, have to maintain a large amount of logic in the applet itself. For example they could have to filter a worldwide list for the specific country. Such an applet would be very large indeed, and cannot be downloaded OTA. Use of such an applet on an existing handset would therefore require SIM replacement. In the present embodiments by contrast, the server, acting as the Roaming Manager, analyzes the roaming traffic, knowing the exact location of the subscriber and running the application, while the agent drives the handset operations.

The Intelligent Gateway in Reference to the SIM and Integrated Embodiments

When the handset is switched on in the visited country then, as explained, the Intelligent Gateway, which contains the Relay or the probe, the preference unit along with the database and application logic, and possibly an OTA platform, preferably detects the registration process by monitoring the associated MAP messages either via the Mobility Probe 52 or via the SRM 54.

The Intelligent Gateway Determines:

a. Whether the above-mentioned applet needs to be downloaded to the SIM or one is already present. This information is preferably obtained via the OTA-server database.

b. If a new country-specific list of preferred networks needs to be downloaded to the SIM. Typically downloading occurs when the mobile unit starts roaming in the specific country and during subsequent updates as long as the mobile unit is still roaming in that territory.

c. If the currently selected network needs to be exchanged with another higher priority network according to a criteria set of the home network The server then communicates with the OTA gateway to activate the SIM applet via binary SMS, GPRS etc for the appropriate commands.

Handset movement from one VPMN to another while it is turned on is preferably also detected by the Intelligent Gateway. If there are network criteria set that require resuming the preferred network selection, then the Intelligent Gateway triggers the applet to issue a Refresh command to the handset, if for example the handset supports such a Refresh operation. It will be appreciated that the applet does not perform this action if the handset does not support the Refresh feature. In order to cater for such cases the home Intelligent Gateway preferably maintains a list of handset types per subscriber, so that it is able to determine whether the particular handset type is capable of supporting refresh. Another possibility for determining the handset type is the ability to extract the IMEI or handset identification via a SIM toolkit applet. Such a handset identification applet can be installed over the air, and then triggered via the OTA platform. The applet extracts the IMEI from the handset, and sends it back to the intelligent gateway as a binary SMS or using GPRS or the like. The home gateway may then determine, based on the IMEI, what the handset type is.

Returning now to FIG. 17, and according to the embodiment of FIG. 4, an operator may wish to select a combined approach to controlling preferred network selection. In the latter case the Intelligent Gateway application logic combines each method's capabilities to provide an optimized solution.

Remote registration control is combined with the ability to download country-specific Preferred Lists. Using such a combination makes it possible to send updated lists at any time and then trigger mobile units to carry out network selection by logging them off the network or alternatively triggering them through the same OTA server that is used to provide the lists. The integrated solution provides the following advantages:

Better response time to the user

Lower signaling traffic to/from the VPMN

As explained above, the operator is able to apply different approaches to different events based on profiles such as: the visited country, the visited network, the subscriber's community, and the date and time.

Both the probing only and integrated approach lead to downloading of an updated country-specific List of Preferred Networks, but only the integrated approach actively rejects an undesired registration attempt.

Figure 18:
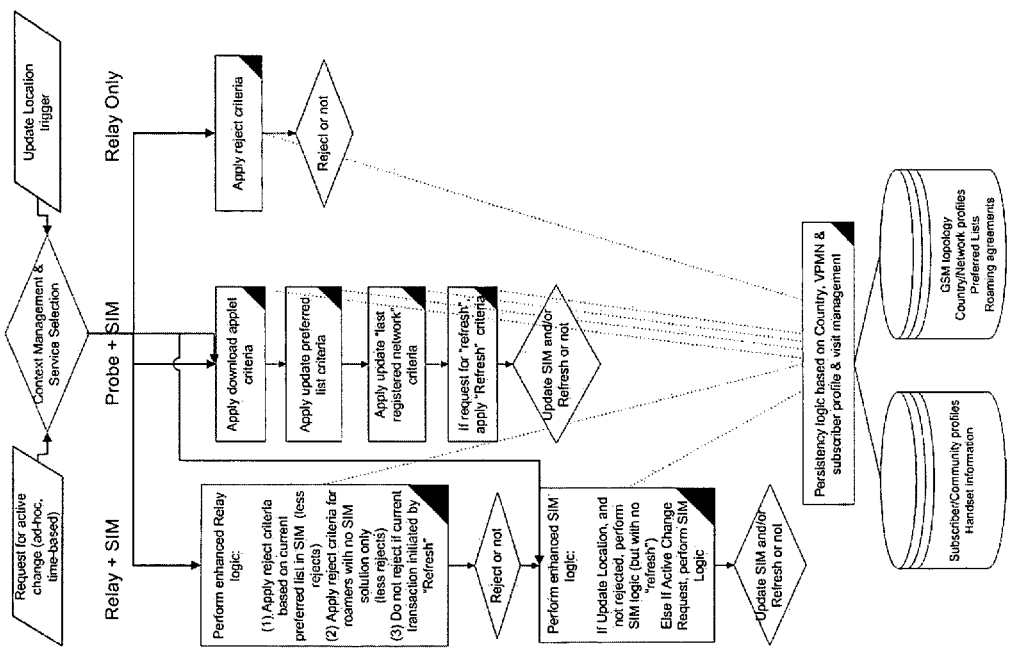
FIG. 18 is a simplified flow chart showing use of the three embodiments of FIGS. 2 to 4 side by side for comparison.

Reference is now made to FIG. 18 which is a simplified flow chart that shows comparative process flows for the three methods described above, relay only, probe+SIM and Relay+SIM, according to preferred embodiments of the present invention. In all three cases an update location request from a roaming user can act as a trigger. In the SIM based embodiments an active trigger can be used to send updates to the roaming devices. In the case of the relay only solution, certain reject criteria are set, typically that the network being accessed is not the preferred network. The request is then accepted or rejected according to the criteria.

In the case of the probe+SIM embodiment, an applet is downloaded to the roaming device as discussed. Then a preference list is sent to the roaming device, that is to say the mobile unit. In a preferred embodiment the handset changes the RPLMN field of the LOCI file before issuing a Refresh trigger, so as to prevent the handset from connecting to the previous registered network without consulting the preferred list at all. This may be implemented by modifying the RPLMN to a null value, that is erase its content. An alternative implementation in fact stores the preferred network at that location. The latter embodiment saves time, since the handset typically first consults the RPLMN, before going to the preferred list itself. Refresh criteria can also be downloaded to the roaming device. The applet itself decides how to use the information from the downloads, that is when to seek a new network, based on the criteria it has been sent.

In the relay plus SIM embodiment, the probe/relay can perform what is known as enhanced relay logic. That is, since the rejection criteria are the same as the criteria held in the SIM, it is often not necessary to actually reject a request. Nevertheless the feature is still needed since roamers change their locations and other conditions can change too. But generally, rejections mainly occur only in the case of roaming devices which do not support the SIM solution. Furthermore the probe can be set not to reject any requests that result from a refresh operation. The features of persistency, profiles and topology are discussed hereinbelow.

The Preferred Network application preferably allows the Operator to configure criteria according to which the application both downloads updated Preferred Lists as well as triggers handsets to resume the network selection process. This capability provides a flexible throttling mechanism that can be customized to the visited country, the visited network, the subscriber profile, the date and time and other parameters.

The operator is preferably able to configure per visited country whether to activate or deactivate the Intelligent Preferred Network, either completely or using just one of the three methods described above. The operator will also be able to apply different profiles to different countries as explained below.

Such a list of preferred networks is preferably applicable for all three methods.

The applet that is downloaded to the SIM when roaming is first discovered can be used to perform additional functions to support roaming. For example it can carry out short code translation. That is to say a given home network has certain short codes for services, for example *155 may give voicemail. The foreign network may not recognize the code at all, or it may not lead the roamer to his own voicemail since he is on a different network. The SIM applet may be set to recognize certain short codes and be able to translate them into a dialing sequence that will work to reach the home network. Likewise the SIM applet may also support what are known as world wide numbers. For example a certain short code may reach a taxi service on the home network. In this case a roamer is not interested in reaching a home taxi service. He wants a taxi service in the place where he is roaming. The SIM applet can again recognize the short code and carry out translation so that the user obtains a local taxi service. Similar features may be included to allow support for corporate extensions for users of virtual private networks (VPN). In general the user of a virtual private network is able to dial extension numbers of his work colleagues and his home network performs the translation so that he does not have to dial the full number. A small extension to the SIM applet allows such a feature to be available whilst roaming as well.

An intelligent call completion, or dialing correction, feature can be provided using the SIM applet. Thus a set of rules for correcting numbers can be included in the SIM applet for downloading, which can be applied to all dialed numbers. It will be appreciated that the rules may vary per country and thus the applet, which is downloaded per country is the ideal way to send such a feature to the mobile telephone.

A further use for the present embodiments is to prevent what is known as accidental roaming. Accidental roaming occurs while a subscriber travels near the borders between one country and another. At some point the user may be picked up by one of the networks from the other side of the border. This is undesirable as it typically involves the user, who has not crossed any borders, in substantial additional cost and generally wastes resources.

Accidental roaming can be prevented, in particular according to the first of the three principal embodiments of the present invention, simply by treating the networks on the other side of the border as non-preferred networks and rejecting any roaming request for them from a user whose previous connection was via a base station near the border but say not near a border crossing. The genuine roamer, that is one who has actually crossed the border, eventually gets connected, either because he crossed at a location recognized as a border crossing or after a certain number of roaming requests is exceeded.

In a preferred embodiment, special criteria can be applied to customers who actually live near the border. That is to say users who live near the border can be considered as a category or community of users to which special rules apply.

It is expected that during the life of this patent many relevant roaming communication devices and systems will be developed and the scope of the terms herein, particularly of the terms "roaming" and "mobile network", is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A remote preference unit for influencing visited network selection by roaming mobile units making roaming registration attemps, the preference unit comprising:
   a detection unit for detection of roaming activity by mobile units
   a database indicative of preferred networks for selection by roaming units, and
   an output unit, associated with said detection unit and said database to output indications to influence network selection by said detected roaming mobile units,
   wherein said output indications are rejection signals to roaming registration attempts to respective non-preferred roaming networks, and said roaming registration rejection signals are sent to location infrastructure of respective non-preferred roaming networks, thereby to cause a roaming registration attempt to fail at said non-preferred network and force said mobile units to re-attempt roaming registration, thereby at said reattempting to select a preferred roaming network.

2. The remote preference unit of claim 1, further comprising logic for assigning different preference information under different conditions.

3. The remote preference unit of claim 2, wherein said conditions comprise time, such that different network selection preferences are sent out based on different times.

4. The remote preference unit of claim 3, wherein a time used to set said preferences is local time at a roaming location.

5. The remote preference unit of claim 2, wherein said conditions comprise one of profile settings and abilities of an individual roaming handset.

6. The remote preference unit of claim 5, wherein said conditions are based on a segment of users to which a current handset belongs, such that said preference information is applied differently to different segments.

7. The remote preference unit of claim 2, wherein said conditions comprise the proportions of roaming users currently connected to different available networks in a given roaming region.

* * * * *